(12) United States Patent
Sagawa

(10) Patent No.: US 10,845,750 B2
(45) Date of Patent: Nov. 24, 2020

(54) DRIVE TRANSMISSION DEVICE AND IMAGE FORMATION APPARATUS

(71) Applicant: Oki Data Corporation, Tokyo (JP)

(72) Inventor: Yasumasa Sagawa, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 16/512,374

(22) Filed: Jul. 16, 2019

(65) Prior Publication Data
US 2020/0073312 A1 Mar. 5, 2020

(30) Foreign Application Priority Data
Aug. 30, 2018 (JP) .................................. 2018-161781

(51) Int. Cl.
*G03G 15/00* (2006.01)
*F16D 3/04* (2006.01)

(52) U.S. Cl.
CPC ............. *G03G 15/757* (2013.01); *F16D 3/04* (2013.01)

(58) Field of Classification Search
CPC .................................. G03G 15/757; F16D 3/04
See application file for complete search history.

(56) References Cited

U.S. PATENT DOCUMENTS

| 4,744,339 A * | 5/1988 | Nagai ...................... F02P 5/06 |
| | | 123/146.5 A |
| 2014/0023396 A1* | 1/2014 | Shiobara .............. G03G 15/757 |
| | | 399/167 |
| 2015/0139688 A1* | 5/2015 | Leemhuis .......... G03G 21/1652 |
| | | 399/110 |

FOREIGN PATENT DOCUMENTS

JP 2015-18125 A 1/2015

* cited by examiner

*Primary Examiner* — Sevan A Aydin
(74) *Attorney, Agent, or Firm* — Metrolex IP Law Group, PLLC

(57) ABSTRACT

A drive transmission device according to an embodiment may include: a driving shaft configured to be rotated by a driving source; a driven shaft; and a coupling device including a driving side coupling connected to the driving shaft and a driven side coupling connected to the driven shaft, and configured to selectively couple the driving shaft and the driven shaft with each other to transmit a rotation of the driving shaft to the driven shaft. The driving side coupling may include an Oldham's coupling including a driving side rotor, an intermediate rotor, and a driven side rotor and configured to absorb an eccentricity between the driving shaft and the driven shaft, wherein the driving side coupling further comprises a bias member provided inside of the driving side coupling, the bias member biasing the driven side rotor toward the driven side coupling.

11 Claims, 15 Drawing Sheets

DRIVE TRANSMISSION DEVICE AND IMAGE FORMATION APPARATUS

CROSS REFERENCE TO RELATED APPLICATIONS

This application claims priority based on 35 USC 119 from prior Japanese Patent Application No. 2018-161781 filed on Aug. 30, 2018, entitled "DRIVE TRANSMISSION DEVICE AND IMAGE FORMATION APPARATUS," the entire contents of which are incorporated herein by reference.

BACKGROUND

The disclosure relates to a drive transmission device and an image formation apparatus.

In a related art, an image formation apparatus, such as an electrophotographic printer, copier, facsimile, multi-function peripheral ("MFP"), or the like, for example, a printer includes an apparatus body such as a printer body and an image formation unit detachably attached to the apparatus body and including a photosensitive drum, a charging roller, a development roller, a toner supplying roller, and the like. The charging roller charges a surface of the photosensitive drum uniformly, a LED head exposes light to form an electrostatic latent image, the development roller develops the electrostatic latent image with toner to form a toner image, a transfer roller transfers the toner image to a sheet, and a fixation unit fuses (fixes) the toner image to the sheet to thereby form (print) an image on the sheet.

The photosensitive drum, the charging roller, the development roller, the toner supplying roller, and the like are respectively connected to a drive motor via drive transmission devices, and thus are driven to rotate by the rotation of the drive motor.

Each of the drive transmission devices includes a driving gear, a driving shaft, a driven shaft, a coupling device, and the like. The driving gear is rotatably provided in the apparatus body and configured to transmits the rotation of the drive motor to the image formation unit. The driving shaft supports the driving gear to be rotatable. The driven shaft is provided for the corresponding driving shaft, rotatably supported in the image formation unit, and configured to transmit the rotation of the driving shaft to the photosensitive drum, the charging roller, the development roller, the toner supplying roller, or the like. The coupling device is configured to selectively couple the driving shaft with the driven shaft. The coupling device includes a driving side coupling connected to the driving shaft and a driven side coupling connected to the driven shaft.

Each of the drive transmission devices includes a bias member such as a spring to bias the driving side coupling toward the driven side coupling so as to prevent a decoupling between the driving side coupling and the driven side coupling after the drive transmission device is attached to the image formation unit. The spring is provided between the driving gear and the driving side coupling (for example, Patent Document 1).

Patent Document 1: Japanese Patent Application Laid-Open No. 2015-18125

SUMMARY

However, in the related art, because the driving gear and the spring are overlapped with each other in the radial direction thereof, the driving gear and the driving side coupling need to be spaced away from each other in the axial direction, which enlarges a size of the drive transmission device.

In a case where the diameter of each of the driving gears is enlarged in order to suppress uneven rotations of the charging roller, the development roller, the toner supplying roller, and the like due to variations of pitches of teeth of each of the driving gears, the driving gear and the spring are largely overlapped with each other in the radial direction. Therefore, the driving gear and the driving side coupling needs to be sufficiently away from each other in the axial direction, which further enlarges the drive transmission device in size.

In order to precisely form the toner image on the photosensitive drum, an operator connects, when attaching the image formation unit to the apparatus body, the driving shaft and the driven shaft at the photosensitive drum, places the photosensitive drum to the reference position, and then positions, with respect to the photosensitive drum, the charging roller, the development roller, the toner supplying roller, and the like. However, if the image formation unit is not precisely attached to the apparatus body due to manufacturing errors, assembly errors or the like in the image formation unit, the drive transmission device, and the like, the driving shaft and the driven shaft may not be aligned with (may be eccentric to) each other, so that the rotation of the drive motor cannot be smoothly transmitted to the photosensitive drum and the development roller. This may cause vibration at the image formation unit and may deteriorate the image quality.

Accordingly, an Oldham's coupling may be used for the driving side coupling, so as to absorb the misalignment of the driving shaft and the driven shaft.

However, in a case where the Oldham's coupling is used, the position of the coupling tip of the Oldham's coupling may vary in a state where the driving side coupling and the driven side coupling are not coupled. This may make it difficult to couple the driving side coupling and the driven side coupling. Accordingly, the driven side coupling may need to be enlarged, which may further enlarge the drive transmission device.

Therefore, the printer may be further enlarged.

An object of an aspect of the disclosure may be to provide a drive transmission device and an image formation apparatus that are capable of preventing or suppressing vibration of an image formation unit and deterioration of an image quality, while preventing enlargement of the image formation apparatus in size.

An aspect of the disclosure may be a drive transmission device that may include: a driving shaft configured to be rotated by a driving source; a driven shaft; and a coupling device including a driving side coupling connected to the driving shaft and a driven side coupling connected to the driven shaft, and configured to selectively couple the driving shaft and the driven shaft with each other to transmit a rotation of the driving shaft to the driven shaft.

The driving side coupling includes an Oldham's coupling comprising a driving side rotor, an intermediate rotor, and a driven side rotor and configured to absorb an eccentricity between the driving shaft and the driven shaft, wherein the driving side coupling further comprises a bias member provided inside of the driving side coupling, the bias member biasing the driven side rotor toward the driven side coupling.

According to the above aspect, the driving side coupling includes the Oldham's coupling that absorb the eccentricity between the driving shaft and the driven shaft and includes the driving side rotor, the intermediate rotor, and the driven side rotor. The driving side coupling includes the bias member which is provided inside of the driving side coupling and biases the driven side rotor toward the driven side coupling. Accordingly, the driving side coupling and the driven side coupling can be coupled to each other by the bias force of the bias member.

Thus, the bias member does not need to be provided outside of the driving side coupling. Therefore, the drive transmission device can be downsized.

Further, the driving side coupling can absorb the misalignment between the driving shaft and the driven shaft, to prevent or suppress vibrations in the image formation unit, so as to prevent or suppress deterioration of the image quality.

Furthermore, the bias member prevents or suppresses displacements of the driven side rotor of the Oldham's coupling in the state where the driving side coupling and the driven side coupling are not coupled with each other, and therefore can facilitate an operation of coupling the driving side coupling with the driven side coupling. Therefore, this can prevent an enlargement of the driven side coupling, and thus can further downsize the drive transmission device.

Therefore, the image formation apparatus according to the above aspect can be downsized.

DETAILED DESCRIPTION

Figure 1:
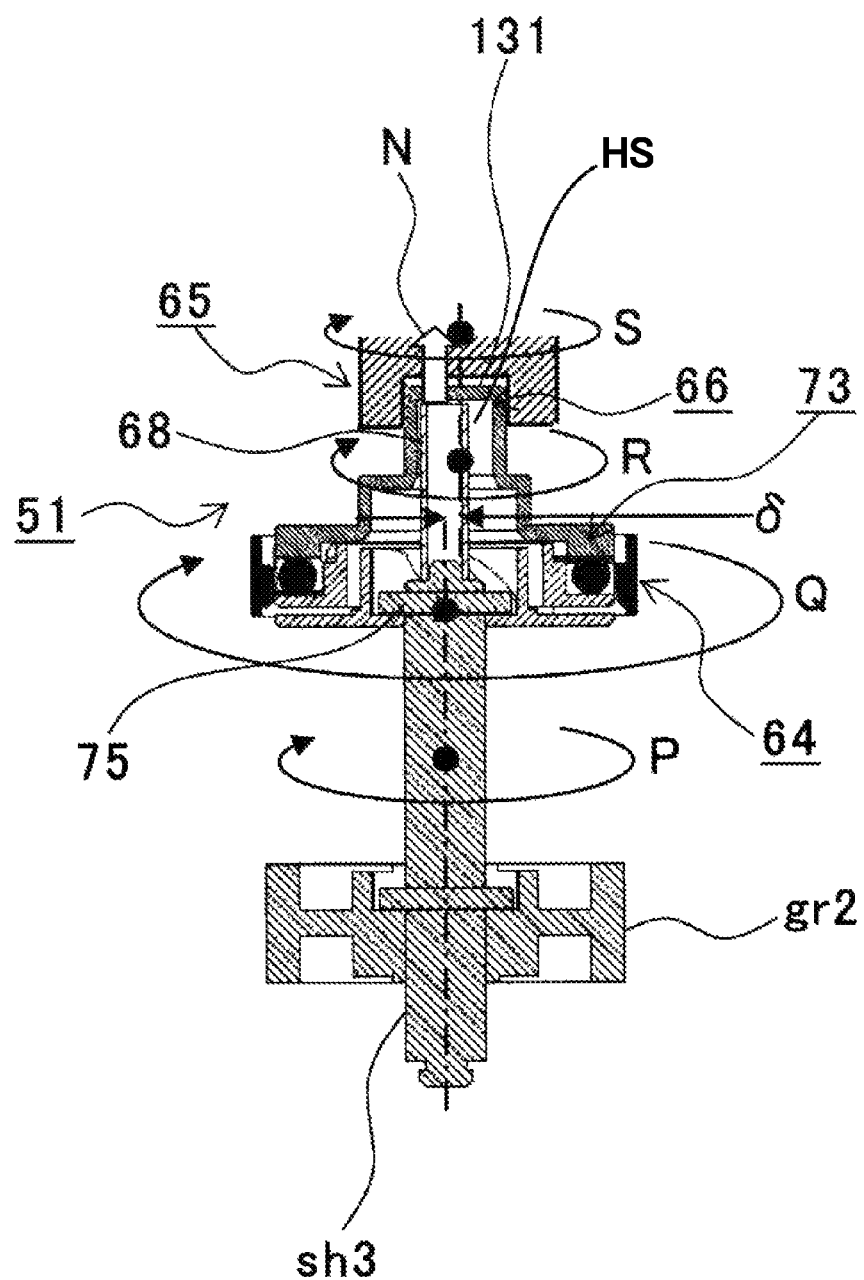
FIG. 1 is a diagram illustrating a view for explaining an operation of a second drive transmission device when activating a drive motor in a state where a driving side coupling and a driven side coupling are coupled with each other.

Descriptions are provided hereinbelow for embodiments based on the drawings. In the respective drawings referenced herein, the same constituents are designated by the same reference numerals and duplicate explanation concerning the same constituents is omitted. All of the drawings are provided to illustrate the respective examples only.

In the following descriptions, an electrophotographic color printer is described as an example of an image formation apparatus.

Figure 2:
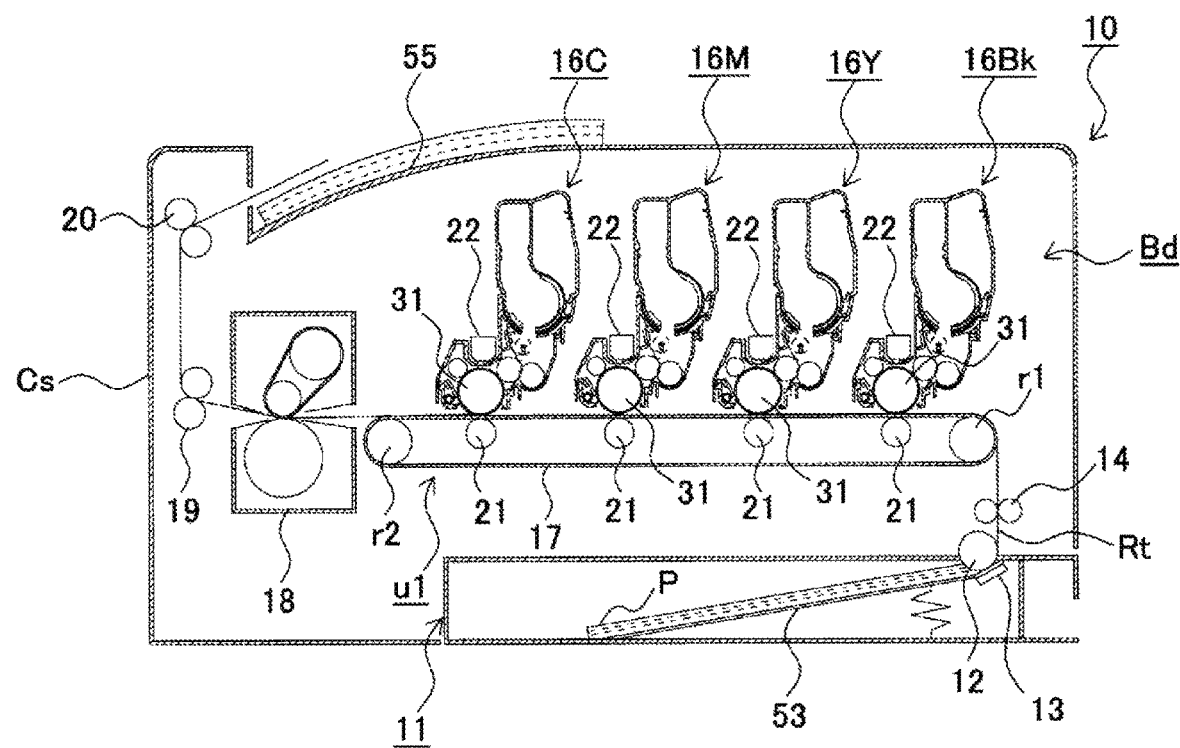
FIG. 2 is a diagram illustrating a view of a printer according to one or more embodiments.
Figure 3:
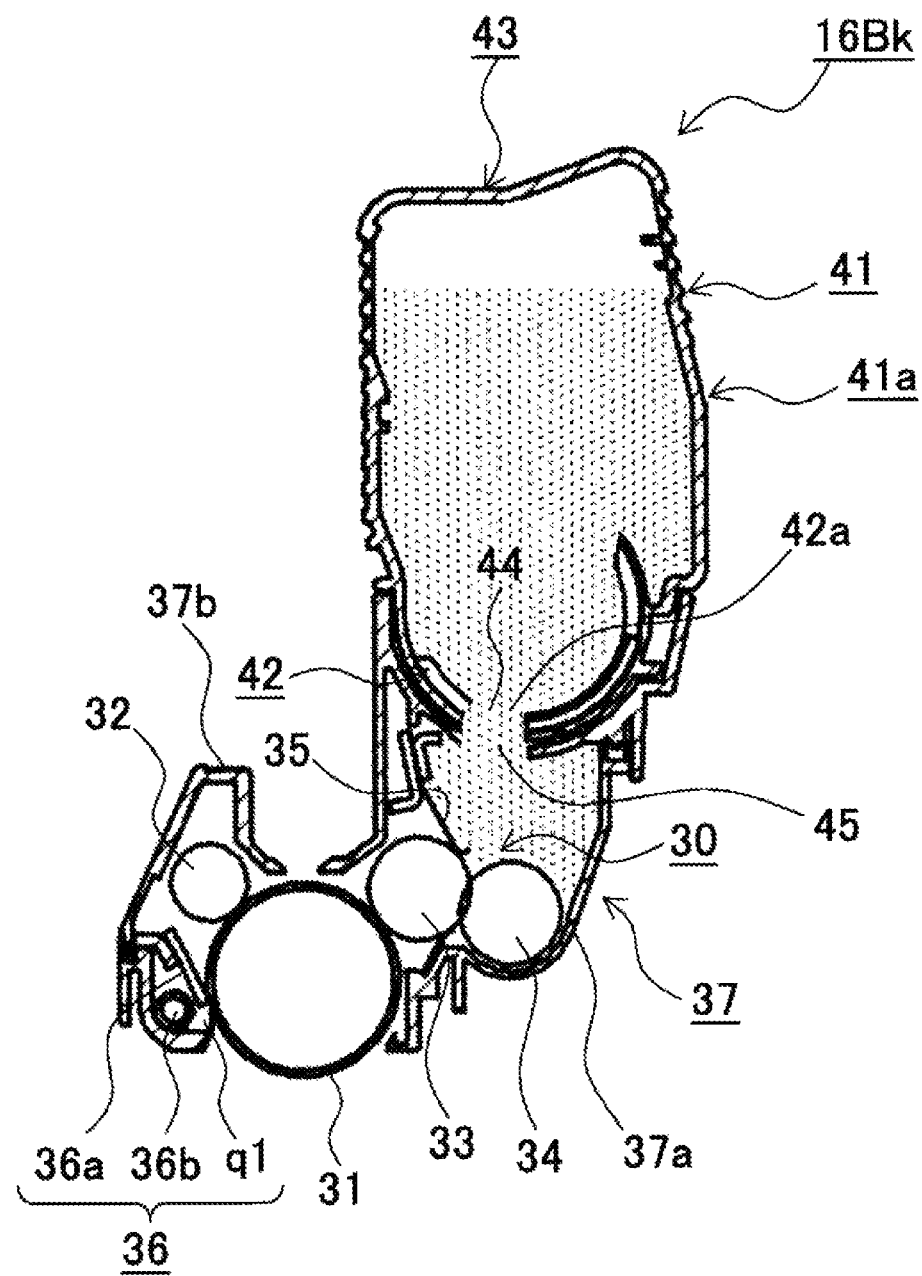
FIG. 3 is a diagram illustrating a conceptual view of an image formation unit according to one or more embodiments.

FIG. 2 is a diagram illustrating a view of a printer according to one or more embodiments. FIG. 3 is a diagram illustrating a conceptual view of an image formation unit according to one or more embodiments.

In FIG. 2, 10 designates a printer, and Cs designate a housing of the printer 10. A paper feeder cassette 11 serving as a media container is provided below the housing Cs. Paper sheets P serving as media are staked on a stacker 53 in the paper feeder cassette 11. A feed mechanism, which is configured to separate the paper P one by one and feeds the paper P, is provided adjacent to the front end of the paper feeder cassette 11.

The feed mechanism includes a feed roller 12 configured to rotate to feed the paper P that is at the uppermost position thereof, and a separator member 13 configured to prevent overlapped feed of paper P. The feed mechanism separates paper P one by one while feeding paper P to a medium transport path Rt. Conveyance roller pair 14 is provided above the feed roller 12 and conveys the fed paper to an image formation section to form a color image.

The image formation section includes image formation units 16Bk, 16Y, 16M, and 16C of black, yellow, magenta, and cyan detachably attached to a body of the printer 10, that is, an apparatus body Bd. Each of image formation units 16Bk, 16Y, 16M, and 16C includes a photosensitive drum 31 serving as image carrier rotatably provided therein.

Above the photosensitive drum 31 of each of image formation units 16Bk, 16Y, 16M, and 16C, a LED head 22 serving as an exposure unit is provided being opposed to the photosensitive drum 31. The LED head 22 exposes light on a surface of the photosensitive drum 31 to form an electrostatic latent image or a latent image thereon.

Below the image formation units 16Bk, 16Y, 16M, and 16C, a transfer unit u1 is provided. The transfer unit u1 includes: a driving roller r1 serving as a first roller; a driven roller r2 serving as a second roller; a transfer belt 17 serving as a (endless) belt member extends between the driving roller r1 and the driven roller r2 to rotate; transfer rollers 21 serving as transferring members rotatably provided at positions opposed to the photosensitive drums 31 of the image formation units with the transfer belt 17 therebetween, thereby forming transfer positions between the transfer rollers 21 and the photosensitive drums 31.

The paper P fed to the image formation unit 16Bk is conveyed along with the travel (or rotation) of the transfer belt 17 and passed through between the photosensitive drums 31 and transfer rollers 21, while developer images or toner images of corresponding colors formed on the photosensitive drums 31 of the image formation units 16Bk, 16Y, 16M, and 16C are subsequently transferred to the paper P by means of the transfer rollers 21, so as to form a multi-color toner image.

Then, the paper P is conveyed to a fixation unit 18. The fixation unit 18 fixes the multi-color toner image to the paper P, to thereby form (print) a multi-color image on the paper P. The paper P discharged from the fixation unit 18 is conveyed by conveyance roller pair 19 and then discharged by the discharging roller pair 20 out of the apparatus body Bd, so as to be stacked on a stacker 55 provided on the top of the housing Cs.

Next, the image formation units 16Bk, 16Y, 16M, and 16C are described. Note that because the image formation units 16Bk, 16Y, 16M, and 16C have the same structure except for colors of toners therein, the following descriptions are made only for the image formation unit 16Bk and thus descriptions for the image formation unit 16Y, 16M, and 16C are omitted for preventing redundancy.

The image formation unit 16Bk is provided extending along a width direction of the paper P. The image formation unit 16Bk includes a main body 37 of the image formation unit 16Bk, or a unit main body 37, and a toner cartridge 41 serving as a developer storage detachably attached to the unit main body 37 as shown in FIG. 3.

The toner cartridge 41 includes a toner tank 41a, serving as a developer container, accommodating therein a toner serving as a developer. In order to supply toner from the toner tank 41a to the unit main body 37, the toner tank 41a is formed with the toner supply port 44, serving as a developer supply port, at a lower surface of a casing 43 thereof. A cylindrical shatter 42, serving as an opening and closing member, is provided to be movable (e.g. rotatable), to open and close the toner supply port 44. The shatter 42 is formed with an opening 42a. By rotating an operation laver (not illustrated) serving as an operation part integrally formed with the shatter 42, the shatter 42 is moved, for example, rotated, to a position where the opening 42a of the shatter 42 is aligned with the toner supply port 44, so as to open the toner supply port 44. By rotating an operation laver to rotate the shatter 42 to a position where the opening 42a of the shatter 42 is not overlapped with the toner supply port 44, the toner supply port 44 gets closed.

The unit main body 37 includes a lower cover 37a, an upper cover 37b covering an upper portion of the lower cover 37a, and side plates (not illustrated) covering left and right sides of the lower cover 37a and the upper cover 37b. The upper cover 37b includes an attachment surface (not illustrated) recessed to set the toner cartridge 41. The attachment surface of the upper cover 37b includes a toner refill port 45 serving as a developer refill port provided corresponding to the toner supply port 44. When the toner supply port 44 is opened, the toner is supplied from the toner tank 41a into the unit main body 37.

The image formation unit 16Bk includes the photosensitive drum 31, the charging roller 32, the development roller 33, the toner supplying roller 34, a development blade 35, a cleaning device 36, and the like in the unit main body 37. The charging roller 32 serving as a charging unit is rotatable while being in contact with the photosensitive drum 31. The charging roller 32 is rotated in a direction (clockwise direction in FIG. 2) opposite to a rotational direction (counterclockwise direction in FIG. 2) of the photosensitive drum 31, along with the rotation of the photosensitive drum 31, to uniformly charge the surface of the photosensitive drum 31. The development roller 33, serving as a developer carrier, is rotatable while being in contact with the photosensitive drum 31. The development roller 33 is rotated in a direction (clockwise direction in FIG. 2) opposite to the rotational direction (counterclockwise direction in FIG. 2) of the photosensitive drum 31, to supply and attach the toner to an electrostatic latent image formed on the photosensitive drum 31, thereby developing the electrostatic latent image with the toner. The toner supplying roller 34, serving as a developer supplying member, is rotatable while being in contact with the development roller 33. The toner supplying roller 34 is rotated in a direction (counterclockwise direction in FIG. 2) same as the rotational direction of the development roller 33, to charge the toner to supply the toner to the development roller 33. The development blade 36, serving as a developer layer regulation member, regulates and thin a thickness of the toner supplied onto the development roller 33 in a uniform manner. The cleaning device 36 scrapes a residual toner which remains on the photosensitive drum 31 after the toner image is transferred from the photosensitive drum 31, to remove the scraped toner as a waste toner.

Note that the development roller 33, the toner supplying roller 34, the development blade 35 make up a developing device 30. The photosensitive drum 31, the charging roller 32, the development roller 33, the toner supplying roller 34, and the like configure rollers for image formation.

The cleaning device 36 includes a cleaning blade 36a, serving as a cleaning member, which extends in the widthwise direction of the image formation unit 16Bk and a tip of which is in contact with the photosensitive drum 31; the waste developer conveyance path q1 provided below the cleaning blade 36a; and the spiral member 36b, serving as a waste toner conveyance member, provided to be rotatable in the waste developer conveyance path q1 and configured to convey the waste toner along with the rotation of the spiral member 36b.

A power source (not illustrated) for the development roller, a power source (not illustrated) for toner supplying roller, and a power source (not illustrated) for the development blade are connected to the development roller 33, the toner supplying roller 34, and the development blade 35, respectively, to apply voltages of negative polarity, serving as bias voltages, to the development roller 33, the toner supplying roller 34, and the development blade 35.

With this configuration, upon printing, the photosensitive drum 31 is rotated in the clockwise direction, the charging roller 32 is rotated in the counterclockwise direction by the rotation of the photosensitive drum 31 to uniformly charge the surface of the photosensitive drum 31, and the charged surface of the photosensitive drum 31 is exposed to light from the LED head 22 to form an electrostatic latent image on the photosensitive drum 31.

Along with the rotation of the photosensitive drum 31 in the clockwise direction, the development roller 33 and the toner supplying roller 34 are rotated in the counterclockwise direction. With this, the toner is supplied from the toner supplying roller 34 to the development roller 33, and the toner supplied to the development roller 33 is conveyed, along with the rotation of the development roller 33, to a contact part between the development roller 33 and the development blade 35 to be regulated and thinned by the development blade 35, and then supplied and attached, along with the rotation of the development roller 33, to the electrostatic latent image on the photosensitive drum 31. With this operation, a toner image is formed on the photosensitive drum 31.

Meanwhile, paper P is conveyed along the medium transport path Rt to a transfer part or a transfer position between the photosensitive drum 31 and the transfer roller 21 of each of the image formation units. With this operation, the toner images of corresponding colors on the photosensitive drums 31 are subsequently transferred onto the paper p by means of the transfer rollers 21, to be superpositioned to form a multi-color toner image on the paper P.

After the toner images are transferred from the photosensitive drums 31, the residual toner on each photosensitive drum 31 is scraped and removed as the waste toner by the cleaning blade 36a along with the rotation of the photosensitive drum 31, and the waste toner is conveyed along the waste developer conveyance path q1 along with the rotation of the spiral member 36b, to be collected into a waste developer container portion (not illustrated) formed in the toner cartridge 41.

The photosensitive drum 31, the charging roller 32, the development roller 33, the toner supplying roller 34, and the like are connected to a drive motor M or a drum motor M (FIG. 5) serving as a driving source for image formation, so as to be rotated by the rotation of the drive motor M.

Therefore, the photosensitive drum 31, the charging roller 32, the development roller 33, the toner supplying roller 34, and the like are respectively connected to the drive motor M through drive transmission devices.

Note that, in order to transmit the rotation of the drive motor M to the photosensitive drum 31, the charging roller 32, the development roller 33, the toner supplying roller 34, and the like, an output shaft of the drive motor M is connected to rotational transmission systems composed of gear trains. To prevent vibration generated by the charging roller 32, the development roller 33, the toner supplying roller 34, and the like from being transferred to the photosensitive drum 31, a rotational transmission system to transmit the rotation of the drive motor to the photosensitive drum 31 is separated from rotational transmission systems to transmit the rotation of the drive motor to the charging roller 32, the development roller 33, the toner supplying roller 34, and the like.

Next, the drive transmission devices are described in detail. Note that the image formation units 16Bk, 16Y, 16M, and 16C have the same structure except for colors of the toners therein. Thus, the following descriptions are made for the drive transmission devices between the drive motor M and the image formation unit 16Bk and descriptions for the drive transmission devices between the drive motor M and the image formation unit 16Y, 16M, and 16C are omitted for preventing redundancy. Further, the drive transmission device between the drive motor M and each of the photosensitive drum 31, the charging roller 32, the development roller 33, the toner supplying roller 34, and the like has the same or similar structure. Therefore, the following descriptions are made for a first drive transmission device 50 (see FIG. 4) between the photosensitive drum 31 and the drive motor M and a second drive transmission device 51 between the development roller 33 and the drive motor M, and descriptions for a drive transmission device between the drive motor M and each of the charging roller 32, the toner supplying roller 34, and the like are omitted for preventing redundancy.

Figure 4:
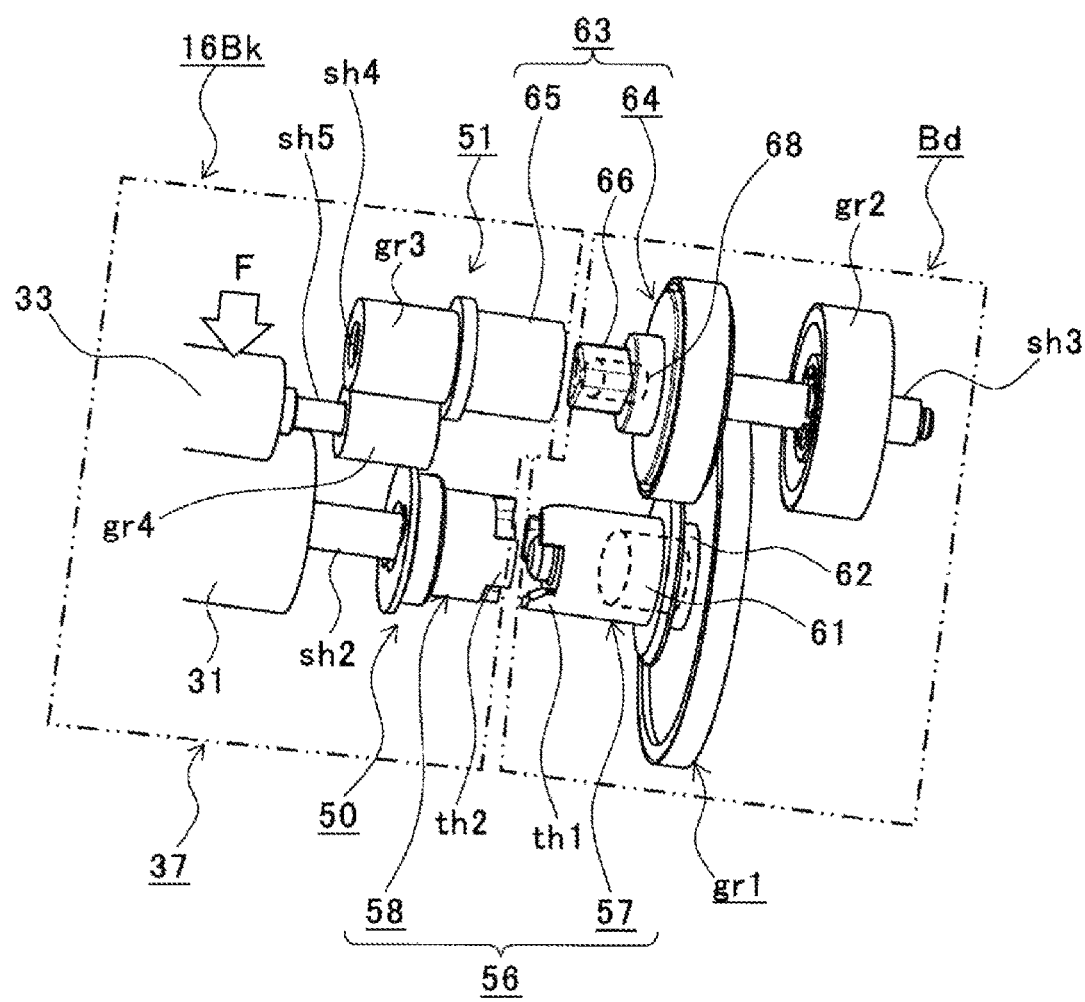
FIG. 4 is a diagram illustrating a perspective view of first and second drive transmission devices in an uncoupled state according to one or more embodiments.
Figure 5:
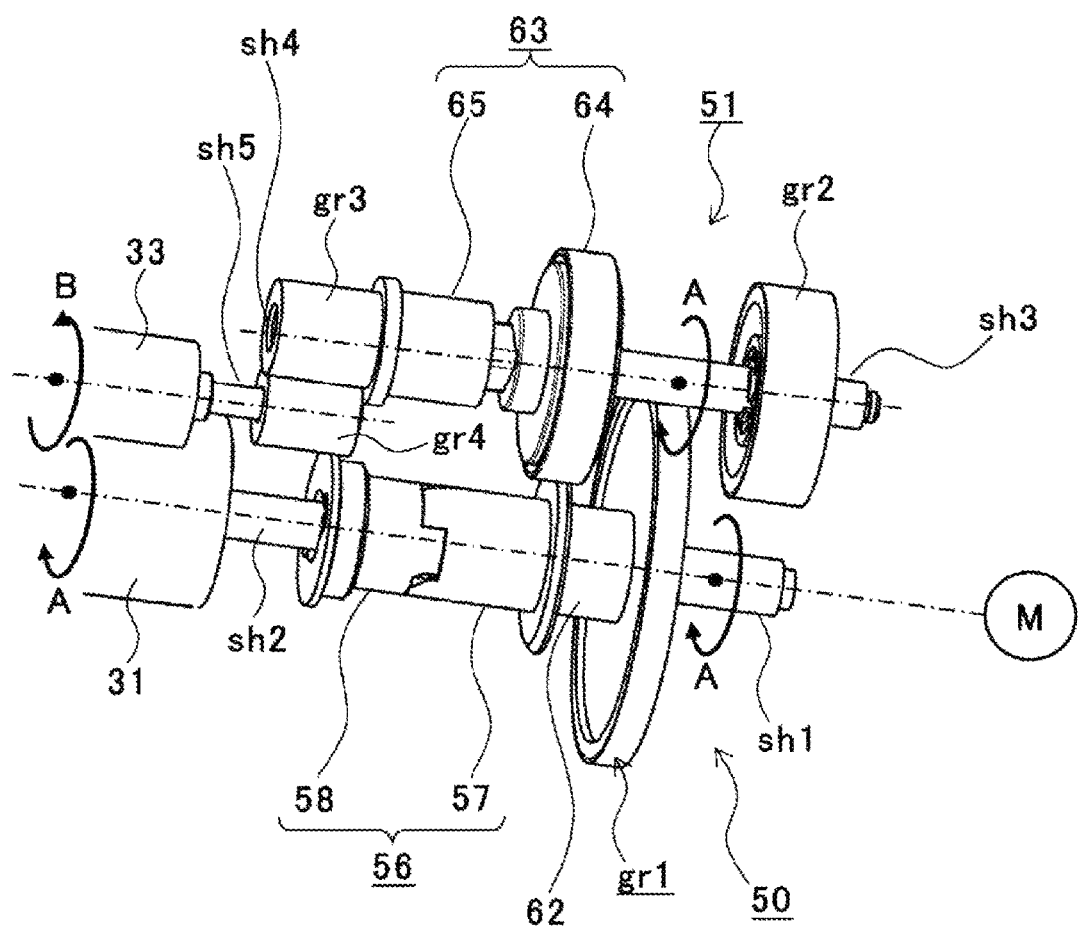
FIG. 5 is a diagram illustrating a perspective view of the first and second drive transmission devices in a coupled state.

FIG. 4 is a diagram illustrating a perspective view of the first and second drive transmission devices in an uncoupled state, and FIG. 5 is a diagram illustrating a perspective view of the first and second drive transmission devices in a coupled state according to one or more embodiments.

In the figures, Bd represents the apparatus body, 16Bk represents the image formation unit, M represents the drive motor, 31 represents the photosensitive drum rotatable in the direction of the arrow A, 33 represents the development roller rotatable in the direction of the arrow B, 37 represents the unit main body of the image formation unit 16Bk, 50 represents the first drive transmission device to connect the photosensitive drum 31 and the drive motor M, and 51 represents the second drive transmission device to connect the development roller 33a and the drive motor M.

The first drive transmission device 50 includes a driving gear (drum gear) gr1, a driving shaft sh1, a driven shaft sh2, a first coupling device 56, and the like. The driving gear gr1 is rotatably provided in the apparatus body Bd so as to be rotated by the rotation of the drive motor M. The driving shaft sh1 supports the driving gear gr1 to be rotatable so as to be rotated in the direction of the arrow A by the rotation of the driving gear gr1. The driven shaft sh2 is provided corresponding to the driving shaft sh1 and be rotatable in the image formation unit 16Bk. The first coupling device 56 is configured to selectively connects the driving shaft sh1 to the driven shaft sh2, to transmits the rotation of the driving shaft sh1 to the driven shaft sh2 to rotate the photosensitive drum 31 in direction of the arrow A.

The first coupling device 56 includes a driving side coupling 57 serving as a first driving side coupling and a driven side coupling 58 serving as a first driven side coupling. The driving side coupling 57 is connected to the driving gear gr1 via a post 61 serving as a coupling member in the apparatus body Bd. The driven side coupling 58 is connected to the driven shaft sh2 in image formation unit 16Bk. In a state where the image formation unit 16Bk is not attached to the apparatus body Bd, the driving side coupling 57 is not coupled to the driven side coupling 58 as shown in FIG. 4. In a state where the image formation unit 16Bk is attached to the apparatus body Bd, the driving side coupling 57 is coupled to the driven side coupling 58 as shown in FIG. 5.

Therefore, an end of the driving side coupling 57 on the side of the driven side coupling 58 is formed with a plurality of (e.g. three) teeth th1 pitched at an equal distance and an end of the driven side coupling 58 on the side of the driving side coupling 57 is formed with a plurality of (e.g. three) teeth th2 pitched at an equal distance, such that the teeth th1 and teeth th2 are able to be geared with each other to couple the driving side coupling 57 and the driven side coupling 58.

Note that the post 61 is projected from the driving gear gr1 toward the driven side coupling 58, and the driving side coupling 57 and the driving gear gr1 are connected to each other by means of the post 61 such that the driving side coupling 57 is not movable in the rotational direction and is movable in the axial direction with respect to the driving gear gr1.

Between the driving gear gr1 and the driving side coupling 57, a spring 62, serving as a first bias member, is provided and surrounds the post 61. In the state where the image formation unit 16Bk is attached to the apparatus body Bd and the driving side coupling 57 is coupled to the driven side coupling 58, the spring 62 biases the driving side coupling 57 toward the driven side coupling 58 with a predetermined bias force The second drive transmission device 51 includes: a driving gear gr2 (development gear) rotatably provided in the apparatus body Bd and configured to be rotated by the rotation of the drive motor M; a driving shaft sh3 supporting the driving gear gr2 to be rotatable and configured to be rotated in the direction of arrow A by the rotation of the driving gear gr2; a first driven shaft sh4 rotatably provided corresponding to the driving shaft sh3 in the image formation unit 16Bk; a second driven shaft sh5 provided parallel to the first driven shaft sh4 and support the development roller 33 to be rotatable; a first driven gear gr3 supported by the first driven shaft sh4; and a second driven gear gr4 supported by the second driven shaft sh5a; a second coupling device 63 configured to selectively connects the driving shaft sh3 to the first driven shaft sh4 to transmits the rotation of the driving shaft sh3 to the driven shaft sh4 to rotate the development roller 33; and the like.

The first and second driven gears gr3 and gr4 are geared with each other, such that the rotation of the first driven shaft sh4 is converted to the rotation of the second driven shaft sh5 in a direction opposite to that of the rotation of the first driven shaft sh4, to rotate the development roller 33 in the direction of the arrow B.

Note that an elastic member (not illustrated), serving as a second bias member, is provided at each of both ends of the second driven shaft sh5, such that each of the elastic members biases the development roller 33 toward the photosensitive drum 31 with a predetermined bias force F.

The second coupling device 63 includes a driving side coupling 64, serving as a second driving side coupling, connected to the driving gear gr2 through the driving shaft sh3 in the apparatus body Bd and a driven side coupling 65, serving as a second driven side coupling, connected to the driven shaft sh4 in the image formation unit 16Bk. In the state where the image formation unit 16Bk is not attached to the apparatus body Bd, the driving side coupling 64 is not coupled to the driven side coupling 65 as shown in FIG. 4, whereas in the state where the image formation unit 16Bk is attached to the apparatus body Bd, the driving side coupling 64 is coupled to the driven side coupling 65 as shown in FIG. 5.

At an end surface of the driving side coupling 64 on the side of the driven side coupling 65 is formed with a fitting projection 66, serving as a fitting part, shaped in a predetermined shape (e.g. a triangular prism shape). At an end surface of the driven side coupling 65 on the side of the driving side coupling 64 is formed with a fitting recess 131 (FIG. 15), serving as a fitting part, for the fitting projection 66, shaped in a predetermined shape, for example, in a triangular prism according to the embodiment. By fitting the fitting projection 66 and the fitting recess 131 to each other, the driving side coupling 64 gets coupled to the driven side coupling 65. On the other hand, by releasing the fitting of the fitting projection 66 and the fitting recess 131, the driving side coupling 64 gets decoupled from the driven side coupling 65. Note that the fitting projection 66 is projected at a predetermined position of the driving side coupling 64, for example, is projected from a flange 101 of a coupling tip 73 (see FIG. 6) toward the driven side coupling 65, and includes a hollow HS therein.

In FIG. 4, 68 designates a spring, serving as a third bias member, provided inside of the driving side coupling 64.

In the apparatus body Bd, an unillustrated coupling control mechanism(s) is provided to couple the driving side couplings 57 and 64 to the driven side couplings 58 and 65 and decouple the driving side couplings 57 and 64 from the driven side couplings 58 and 65.

The coupling control mechanism includes an actuator. When an operator activates the coupling control mechanism, the actuator pushes the driving side coupling 57 toward the driving gear gr1 against the bias force of the spring 62 and pushes the driving side coupling 64 toward the driving gear gr2 against the bias force of the spring 68.

With this, the driving side coupling 57 and the driven side coupling 58 get decoupled from each other and the driving side coupling 64 and the driven side coupling 65 get decoupled from each other.

When the operator deactivates the coupling control mechanism, the actuator stops to push the driving side couplings 57 and 64, and thus the driving side coupling 57 is pushed toward the driven side coupling 58 by means of the bias force of the spring 62 and the driving side coupling 64 is pushed toward the driven side coupling 65 by means of the bias force of the spring 68.

With this, the driving side coupling 57 and the driven side coupling 58 get coupled with each other and the driving side coupling 64 and the driven side coupling 65 get coupled with each other.

When attaching the image formation unit 16Bk to the apparatus body Bd in an assembly operation, the operator couples the driving shaft sh1 and the driven shaft sh2, and places the photosensitive drum 31 to a reference position, and then positions the development roller 33 with respect to the photosensitive drum 31, in order to form a toner image on the photosensitive drum 31 with a high degree of accuracy. However, if the image formation unit 16Bk, the first and second the drive transmission devices 50 and 51, and the like have a production error(s) or an assembly error(s) or if an accuracy of the positioning of the image formation unit 16Bk is not high, the driving shaft sh3 and the first driven shaft sh4 in the second drive transmission device 51 are not aligned with and are decentered from each other. In such a case, the rotation of the drive motor M is not be smoothly transmitted to the development roller 33, which may cause a vibration to occur in the image formation unit 16Bk, and thus may deteriorate the image quality.

In an embodiment, the driving side coupling 64 of the second drive transmission device 51 uses an Oldham's coupling, to absorb the eccentricity between the driving shaft sh3 and the first driven shaft sh4.

Next, the driving side coupling 64 is described.

Figure 6:
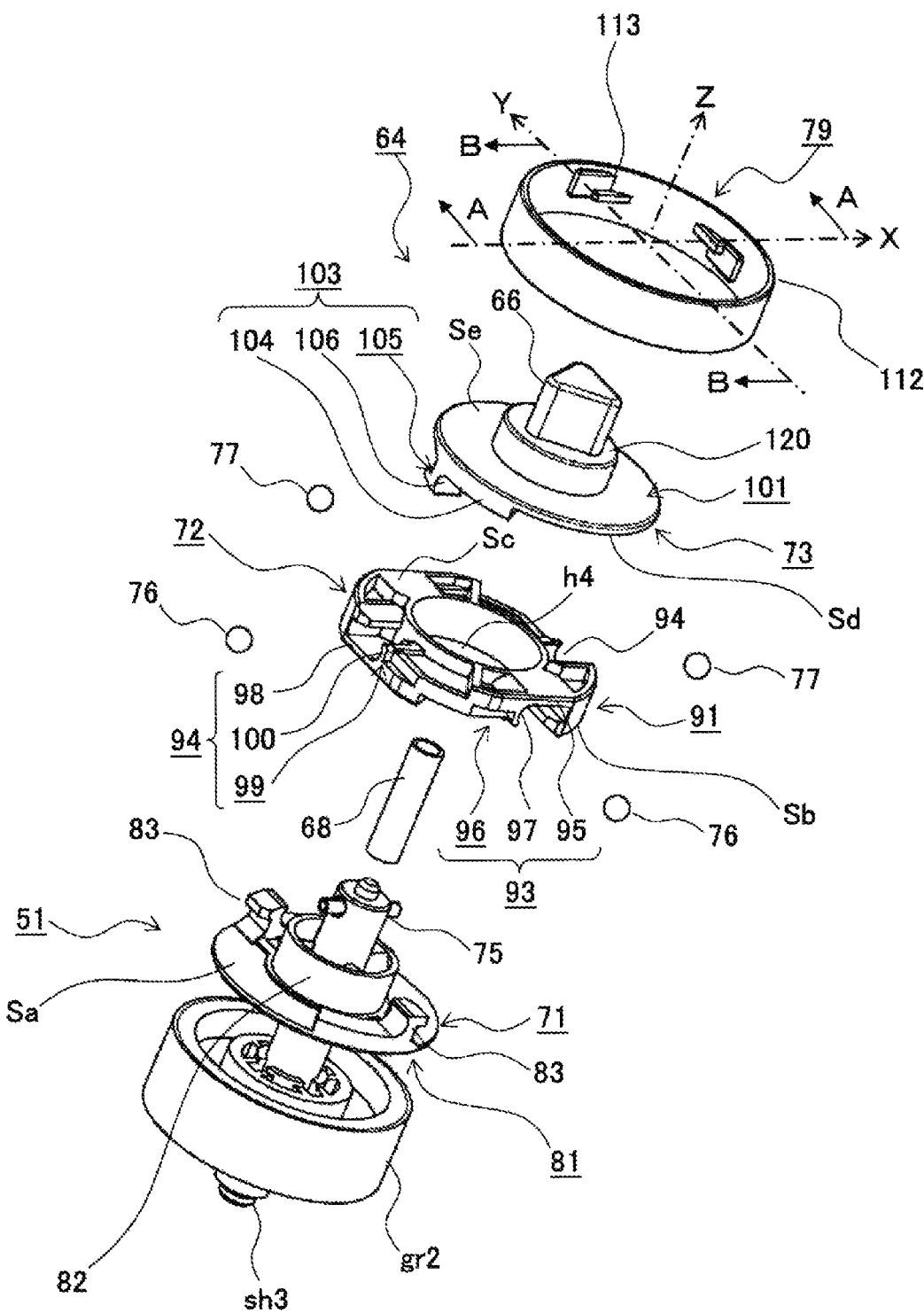
FIG. 6 is a diagram illustrating an exploded perspective view of a driving gear and the second drive transmission device according to one or more embodiments.
Figure 7:
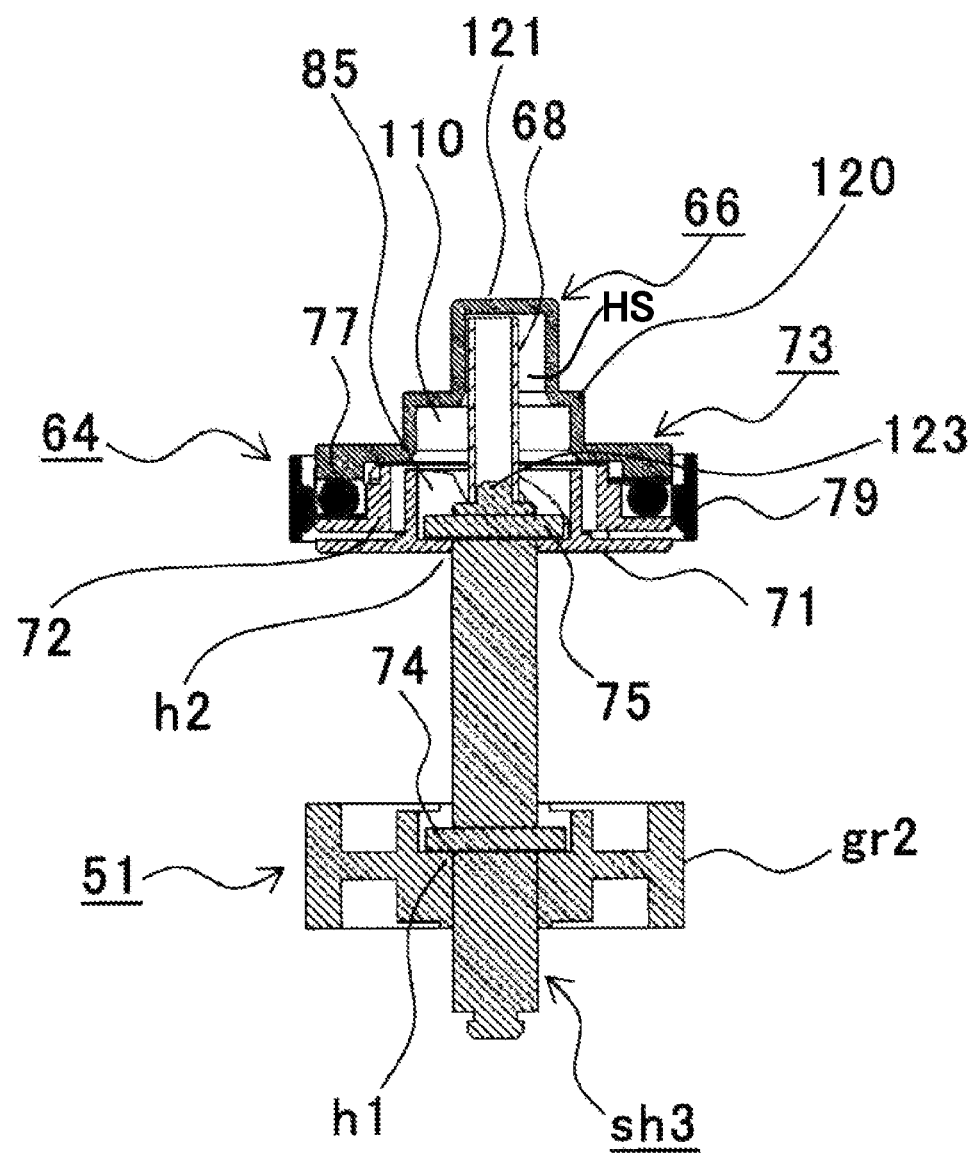
FIG. 7 is a diagram illustrating a sectional view along the A-A line in FIG. 6 according to one or more embodiments.
Figure 8:
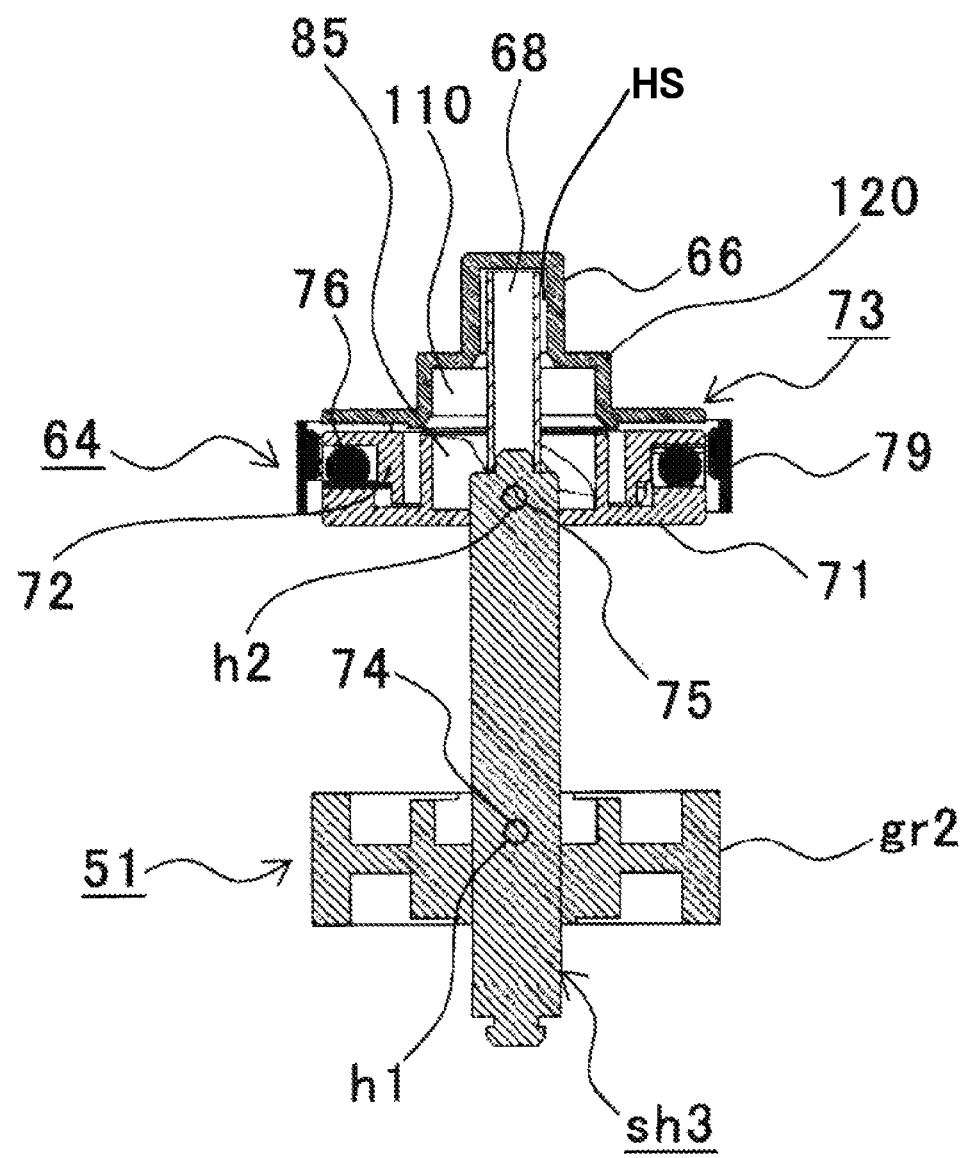
FIG. 8 is a diagram illustrating a sectional view along the B-B line in FIG. 6 according to one or more embodiments.
Figure 9:
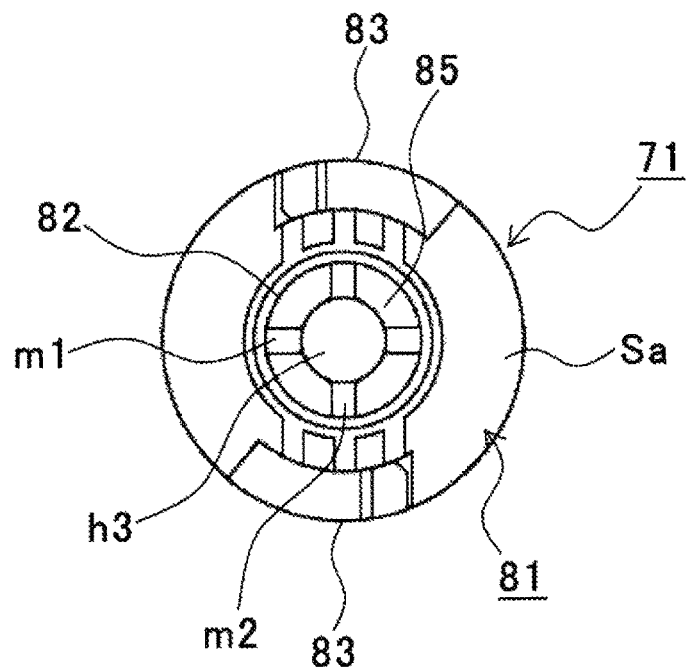
FIG. 9 is a diagram illustrating a plan view of a coupling base according to one or more embodiments.
Figure 10:
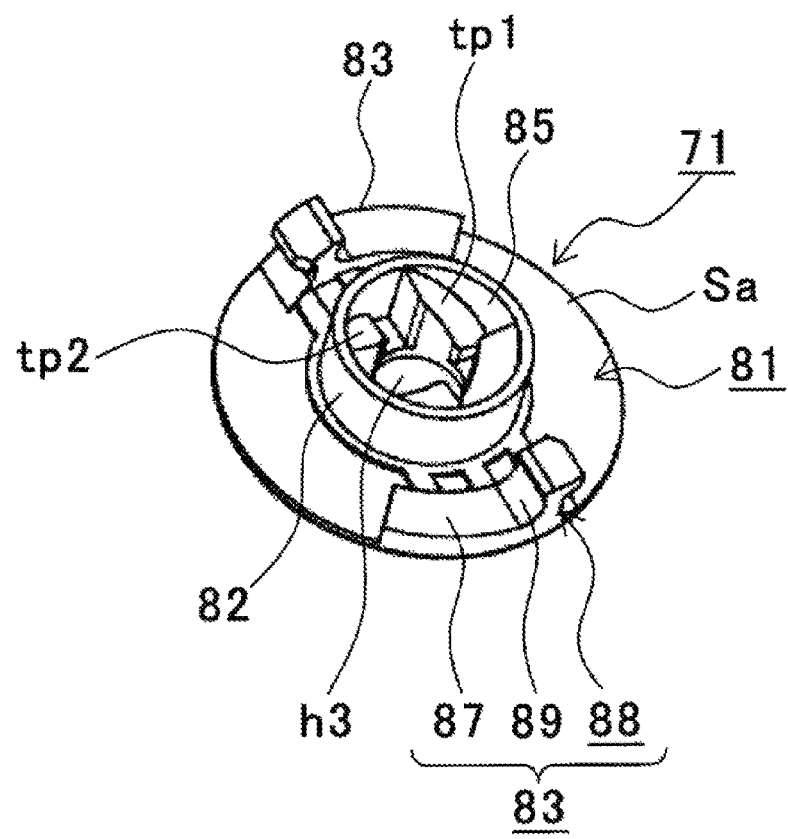
FIG. 10 is a diagram illustrating a perspective view of the coupling base according to one or more embodiments.
Figure 11:
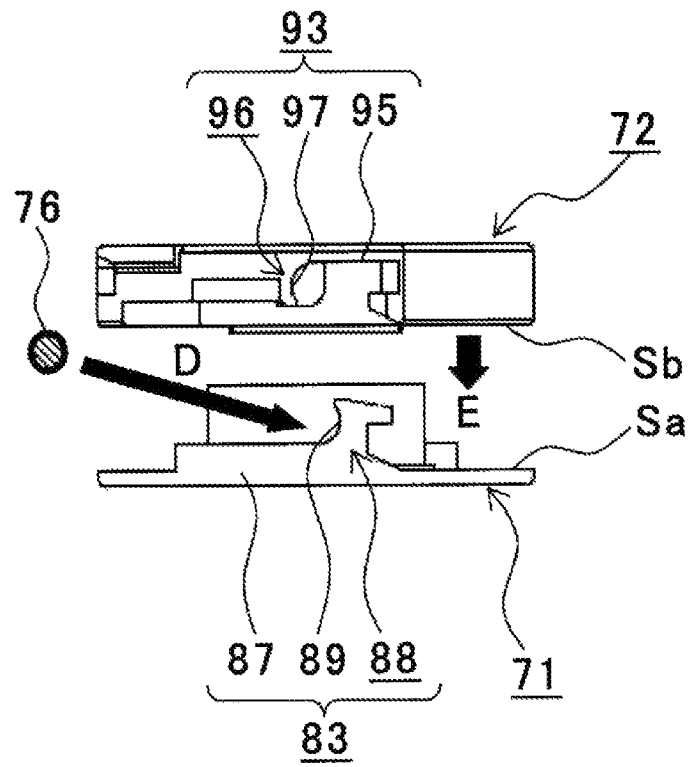
FIG. 11 is a diagram illustrating a view for explaining a relationship between the coupling base and a coupling middle according to one or more embodiments.
Figure 12:
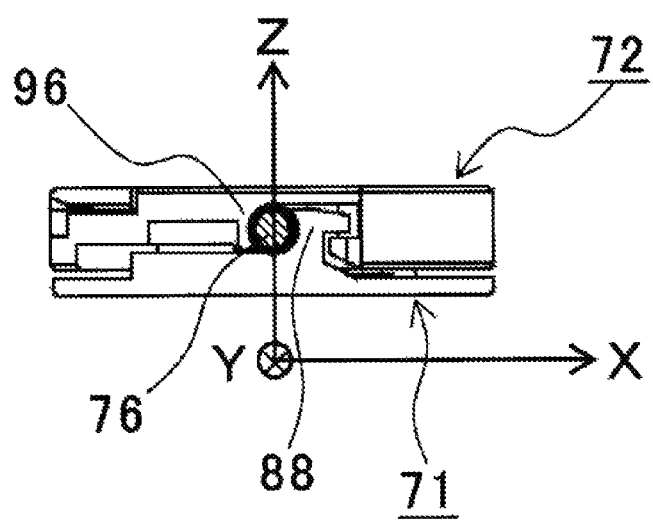
FIG. 12 is a diagram illustrating a view of a state where the coupling base and the coupling middle are coupled with each other according to one or more embodiments.
Figure 13:
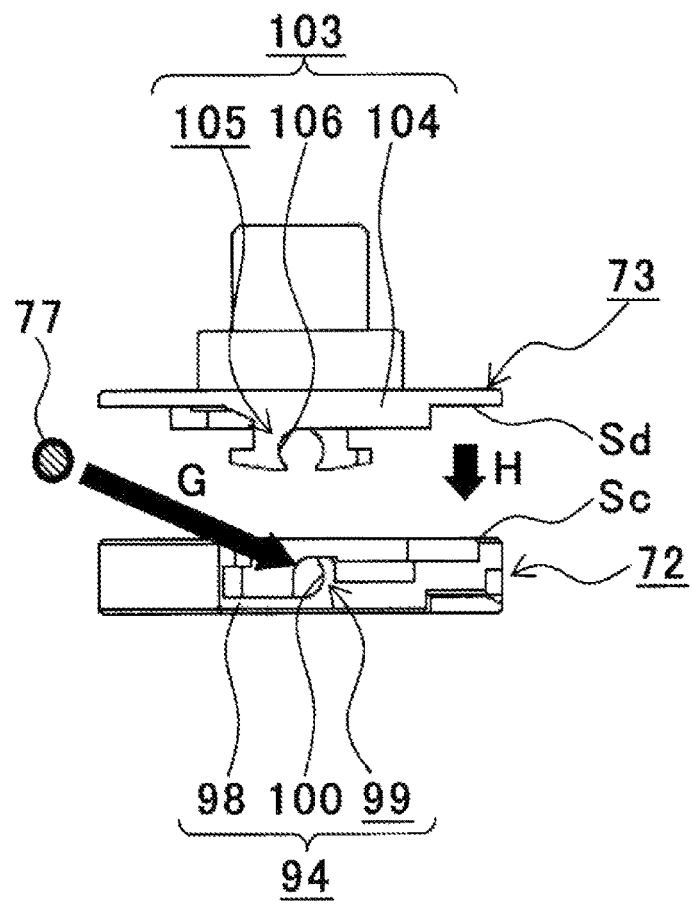
FIG. 13 is a diagram illustrating a view of a relationship between a coupling tip and the coupling middle according to one or more embodiments.
Figure 14:
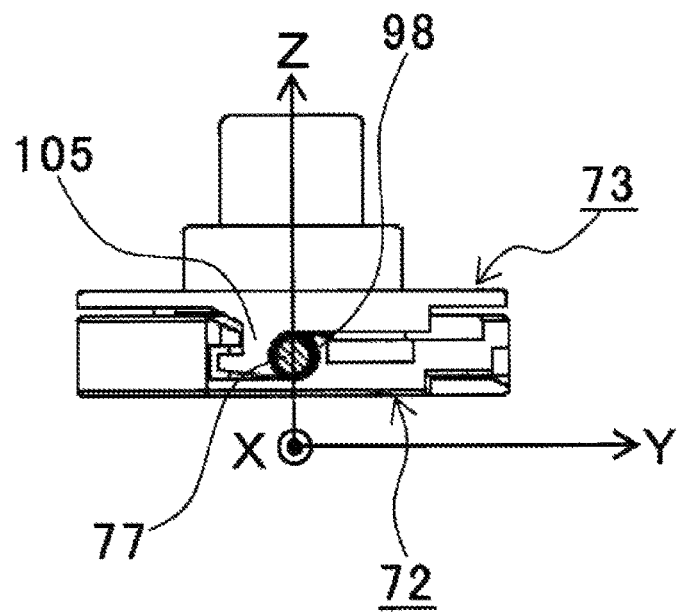
FIG. 14 is a diagram illustrating a view of a state where the coupling tip and the coupling middle are coupled with each other according to one or more embodiments.

FIG. 6 is a diagram illustrating an exploded perspective view of the driving gear and the second drive transmission device. FIG. 7 is a diagram illustrating a sectional view along the A-A line in FIG. 6. FIG. 8 is a diagram illustrating a sectional view along the B-B line in FIG. 6. FIG. 9 is a diagram illustrating a plan view of the coupling base. FIG. 10 is a diagram illustrating a perspective view the coupling base. FIG. 11 is a diagram illustrating a view for explaining a relationship between the coupling base and a coupling middle. FIG. 12 is a diagram illustrating a view of a state where the coupling base and the coupling middle are coupled with each other. FIG. 13 is a diagram illustrating a view of a relationship between a coupling cover and the coupling middle. FIG. 14 is a diagram illustrating a view of a state where the coupling cover and the coupling middle are coupled with each other.

In the figures, 51 designates the second drive transmission device, gr2 designates the driving gear, sh3 designates the driving shaft, 64 designates the driving side coupling, 74 designates a pin, serving as a first transmission member, for transmitting the rotation of the driving gear gr2 to the driving shaft sh3, and 75 designates a pin, serving as a second transmission member, for transmitting the rotation of the driving shaft sh3 to the driving side coupling 64. The driving shaft sh3 includes, at a position corresponding to the driving gear gr2, a hole h1 through which the pin 74 is inserted and extends, and includes, at a tip portion thereof, a hole h2 through which the pin 75 is inserted and extends. The pin 74 is attached to the driving shaft sh3 at the hole h1, and the pin 75 is attached to the driving shaft sh3 at the hole h2.

The driving side coupling 64 includes: a coupling base 71 serving as a driving side rotor; a coupling middle 72 serving as an intermediate rotor, a coupling tip 73 serving as a driven side rotor; plural balls 76 (e.g. two balls 76), serving as driving side rolling elements, provided between the coupling base 71 and the coupling middle 72; plural balls 77 (e.g. two balls 77), serving as driven side rolling elements, provided between the coupling middle 72 and the coupling tip 73; a coupling cover 79 formed in a circular shape or a ring shape that encircles the driving side coupling 64; the spring 68 provided in the hollowed fitting projection 66; and the like.

Where a first direction is represented as the X-axis direction, a second direction is represented as the Y-axis direction, and a third direction is represented as the Z-axis direction in FIG. 6, the coupling base 71, the coupling middle 72, and the coupling tip 73 are stacked in the Z-axis direction, and the coupling middle 72 is moved with respect to the coupling tip 73 in the X-axis direction while rotating the balls 77, and is moved with respect to the coupling base 71 in the Y-axis direction while rotating the balls 76.

The coupling base 71 includes: a plate portion 81 having a circular shape or a ring shape including at the center portion thereof the hole h3 such that the driving shaft sh3 extends through and is slidably accommodated in the hole h3; a tubular portion 82 projected from one of opposite surfaces of the plate portion 81 (for example, a surface Sa of the plate portion 81 facing the coupling middle 72) toward the driven side coupling 65 (FIG. 4) and encircles or surrounds the hole h3; and ball retainers 83, serving as first rolling element retainers, projected from the surface Sa of the plate portion 81 toward the driven side coupling 65, wherein the ball retainers 83 are provided at positions outer than the tubular portion 82 in the radial direction and away from each other by the 180 degree in the circumferential direction thereof.

A pin accommodation part 85, serving as a transmission member accommodation part, is provided at a portion of the coupling base 71 inner than the tubular portion 82 in the radial direction, wherein the pin accommodation part 85 has a tubular or cylindrical shape and accommodates therein the tip portion of the driving shaft sh3 having the pin attached thereto. At two positions apart from each other by the 90 degree in the circumferential direction in the pin accommodation part 85, the grooves m1 and m2, serving as engagement parts, are provided to be engaged with the pin 75. Taper portions tp1 and tp2 are provided adjacent to the grooves m1 and m2 to guide the pin 75 toward the grooves m1 and m2. The pin 75 can be engaged with or disengaged from the grooves m1 and m2.

Accordingly, in a state where the pin 75 is engaged with the grooves m1 and m2, the driving shaft sh3 is not movable with respect to the coupling base 71 in the axial direction and the circumferential direction. On the other hand, in a state where the pin 75 is disengaged from the grooves m1 and m2, the driving shaft sh3 is movable with respect to the coupling base 71 in the axial direction and the circumferential direction. Note that the grooves m1 and m2 have functions to prevent disengagement of the pin 75 and the size of each of the grooves m1 and m2 in the radial direction is larger than the length of the pin 75.

Each of the ball retainers 83 has a first retaining part 87 and a second retaining part 88 in order to retain the balls 76 together with the coupling middle 72. The first retaining part 87 is formed in a flat shape extending within a predetermined range in the circumferential direction, and the second retaining part 88 is projected from an end of the first retaining part 87. A surface 89 of the second retaining part 88 on the side of the first retaining part 87 has a curvature to retain the ball 76. The second retaining parts 88 are cater-cornered to each other across the Y-axis direction.

Note that the other surface of the plate portion 81 (e.g. the surface of the plate portion 81 facing the driving gear gr2) has a flat shape.

The coupling middle 72 includes a plate portion 91 having a circular shape or a ring shape including at the center portion thereof a hole h4 which the tubular portion 82 of the coupling base 71 extends through and is slidably accommodated in. One of opposite surfaces of the plate portion 91, for example, a surface Sb of the plate portion 91 facing the coupling base 71, includes ball retainers 93, serving as second rolling element retainers, recessed therefrom. The ball retainers 93 are provided at positions outer than the hole h4 in the radial direction and away from each other by the 180 degree in the circumferential direction thereof. The other of the opposite surfaces of the plate portion 91, for example, a surface Sc of the plate portion 91 facing the coupling tip 73, includes ball retainers 94, serving as third rolling element retainers, recessed therefrom. The ball retainers 94 are provided at positions outer than the hole h4 in the radial direction and away from each other by the 180 degree in the circumferential direction and away from the ball retainers 93 by the 90 degree in the circumferential direction.

Each of the ball retainers 93 has a first retaining part 95 and a second retaining part 96 in order to retain the balls 76 together with the coupling base 71. The first retaining part 95 extends within a predetermined range in the circumferential direction, and the second retaining part 96 is projected from an end of the first retaining part 95. A surface 97 of the second retaining part 96 on the side of the first retaining part 95 has a curvature to retain the ball 76. The ball retainers 93 are cater-cornered to each other across the Y-axis direction.

Each of the ball retainers 94 includes a first retaining part 98 and a second retaining part 99 in order to retain the balls 77 together with the coupling tip 73. The first retaining part 98 extends within a predetermined range in the circumferential direction, and the second retaining part 99 is projected from an end of the first retaining part 98. A surface 100 of the second retaining part 99 on the side of the first retaining part 98 has a curvature to retain the ball 77. The ball retainers 94 are cater-cornered to each other across the Y-axis direction.

The coupling tip 73 includes the flange 101 having a circular shape or a ring shape. One of opposite surfaces of the flange 101, for example, a surface Sd of the flange 101 facing the coupling middle 72, includes ball retainers 103, serving as fourth rolling element retainers, projected therefrom toward the driving gear gr2. The ball retainers 103 are provided at two positions on an outer periphery of the surface Sd in the radial direction and away from each other by the 180 degree in the circumferential direction thereof.

Each of the ball retainers 103 includes a first retaining part 104 and a second retaining part 105 in order to retain the balls 77 together with the coupling middle 72. The first retaining part 104 extends within a predetermined range in the circumferential direction, and the second retaining part 105 is projected from an end of the first retaining part 104. A surface 106 of the second retaining part 105 on the side of the first retaining part 105 has a curvature to retain the ball 77. The ball retainers 103 are cater-cornered to each other across the Y-axis direction.

The other of the opposite surfaces of the flange 101, for example, a surface Se of the plate flange 101 facing the driven side coupling 65 (FIG. 4), includes, at the center portion thereof, the boss 120 having a predetermined diameter projected toward the driven side coupling 65. A fitting projection 66 is further projected from the boss 120 toward the driven side coupling 65. The boss 120 has a tubular or cylindrical shape forming a pin idling space 110, serving as a transmission member retraction part or space, communicating with the pin accommodation part 85 on the side of the surface Sd. The pin idling space 110 forms an idling space which allows the rotations (idle running) of the driving shaft sh3 with the pin 75 with respect to the driving side coupling 64, when the pin 75 is entered and positioned in the pin idling space 110.

When the ball 76 is abut on the second retaining part 88 of the ball retainers 83 of the coupling base 71 as indicated by the arrow D in FIG. 11 and the coupling middle 72 is moved along the Z-axis direction to be abut on the coupling base 71 as indicated by the arrow E, the ball 76 get retained by the second retaining parts 88 and 96 as illustrated in FIG. 12. With this, the ball 76 is engaged with tips of the second retaining parts 88 and 96, and thus the coupling base 71 and the coupling middle 72 are prevented from being decoupled from each other along the Z-axis direction.

Accordingly, the coupling middle 72 is able to move with respect to the coupling base 71 along the Y-axis direction while rotating the balls 76.

When the ball 77 is about on the second retaining part 99 of the ball retainers 94 of the coupling middle 72 as indicated in the arrow G in FIG. 13 and the coupling tip 73 is moved along the Z-axis direction as indicated by the arrow H to be abut on the coupling middle 72, the ball 77 gets retained by the second retaining parts 99 and 105 as illustrated in FIG. 14. With this, the ball 77 is engaged with tips of the second retaining part 99 and 105, and thus the coupling middle 72 and the coupling tip 73 are prevented from being decoupled from each other along the Z-axis direction.

Accordingly, the coupling middle 72 is able to move with respect to the coupling tip 73 along the X-axis direction, while rotating the ball 77.

Therefore, in a state where the coupling base 71, the coupling middle 72, and the coupling tip 73 are assembled, the coupling middle 72 is able to move in a X-Y plane and the coupling tip 73 is able to move in the Y-Y plane with respect to the driving shaft sh3.

Further, in the state where the coupling base 71, the coupling middle 72, and the coupling tip 73 are assembled, the spring 68 is provided between the seat 123 provided at the end of the driving shaft sh3 and the end 121 of the fitting projection 66, in the fitting projection 66. When the driving side coupling 64 and the driven side coupling 65 are coupled with each other, the spring 68 biases the coupling tip 73 with the predetermined bias force, thereby pushing the fitting projection 66 against the driven side coupling 65. Note that an antifriction agent or the like is applied to a contact surface of the seat 123 and a contact surface of the end 121 of the fitting projection 66 which is in contact with the spring 68, in order to prevent or suppress a friction between one end of the spring 68 and the seat 123 and a friction between the other end of the spring and the end 121 of the fitting projection 66 due to movements of the seat 123 and movements of the end 121 of the fitting projection 66 with respect to the spring 68. Even though the spring 68 is provided between the seat 123 at the end of the driving shaft sh3 and the end 121 of the fitting projection 66 in the above described one or more embodiments, the spring 68 may be provided, in the fitting projection 66, between the coupling base 71 and the end 121 of the fitting projection 66 in an embodiment or a modification. Note that in the above described one or more embodiments, the spring 68 is a coil spring whose axis is aligned with the axis of the driving shaft sh3.

Further, in the state where the coupling base 71, the coupling middle 72, and the coupling tip 73 are assembled, the coupling cover 79 surrounds the outer periphery of the coupling middle 72 so as to prevent the balls 76 and 77 from falling therefrom. Thus, the coupling cover 79 includes a circular portion 112 having a height to cover the coupling middle 72 along the Z-axis direction. The coupling cover 79 further includes, at four positions corresponding to the ball retainers 93 and 94 on an inner circumference of the circular portion 112, regulation portions 113 to prevent movements of the balls 76 and 77 along the X-axis, Y-axis, and Z-axis directions.

Next, an operation of the second drive transmission device 51 in a state where the coupling control mechanism is deactivated to couple the driving side coupling 64 and the driven side coupling 65 with each other is described.

Figure 15:
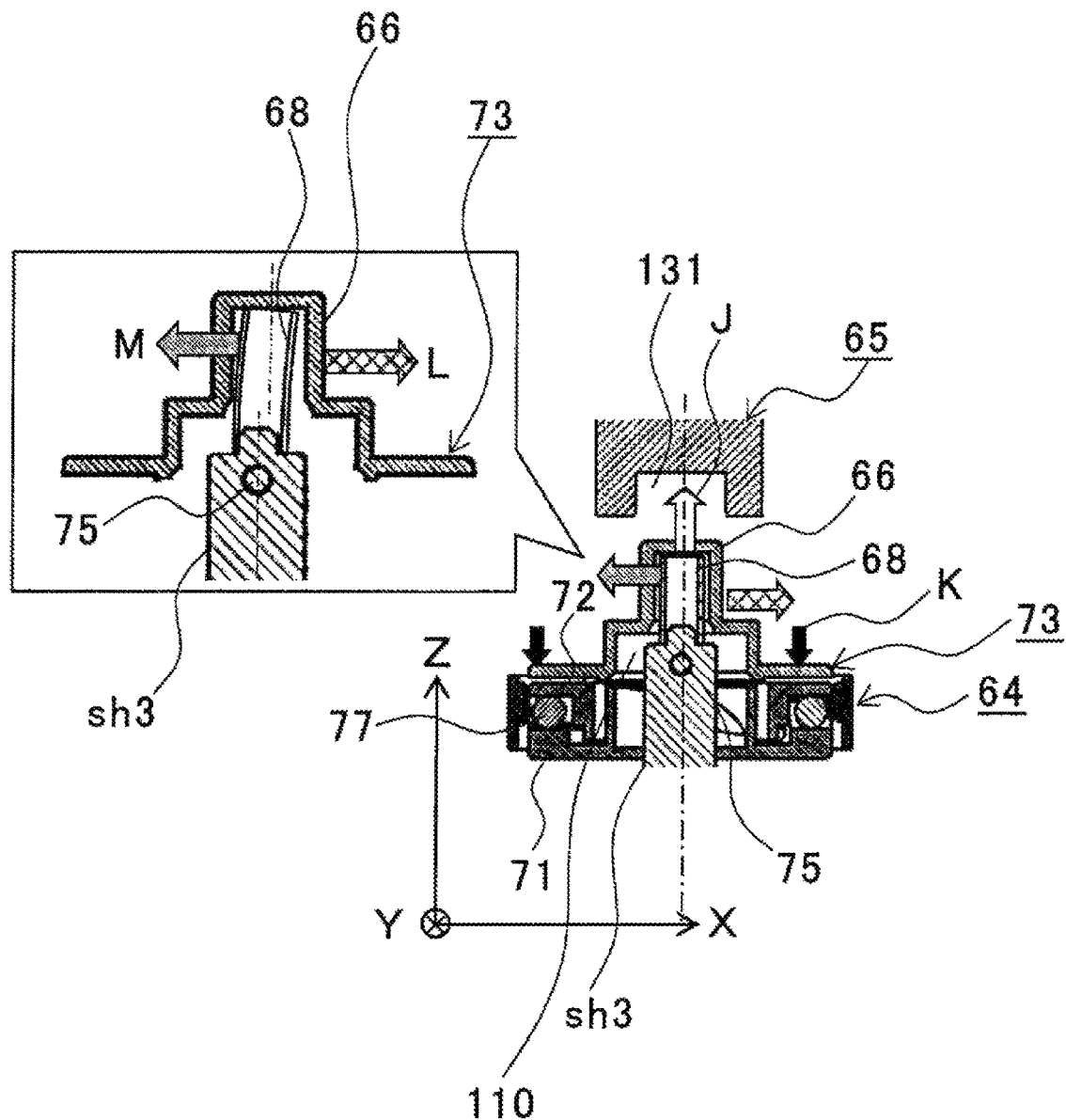
FIG. 15 is a diagram illustrating a view of a state where the driving side coupling and the driven side coupling are not coupled with each other according to one or more embodiments.
Figure 16:
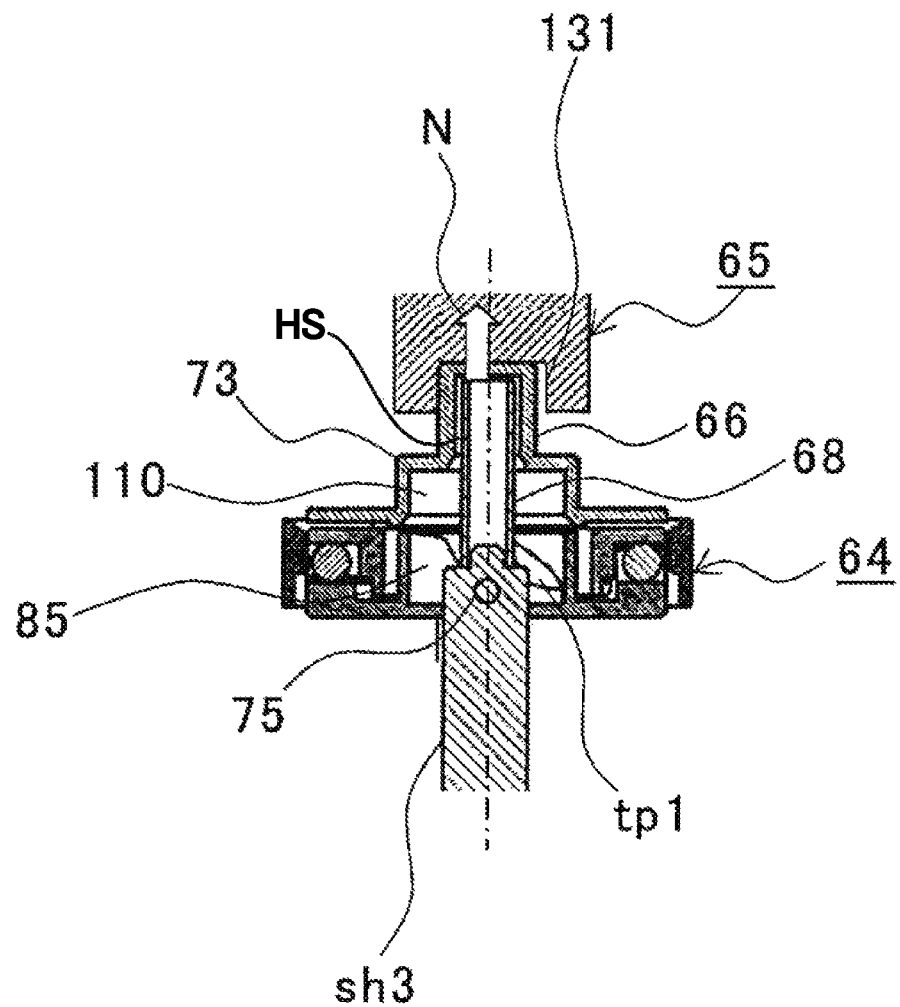
FIG. 16 is a diagram illustrating a view of a state where the driving side coupling and the driven side coupling are coupled with each other according to one or more embodiments.
Figure 17:
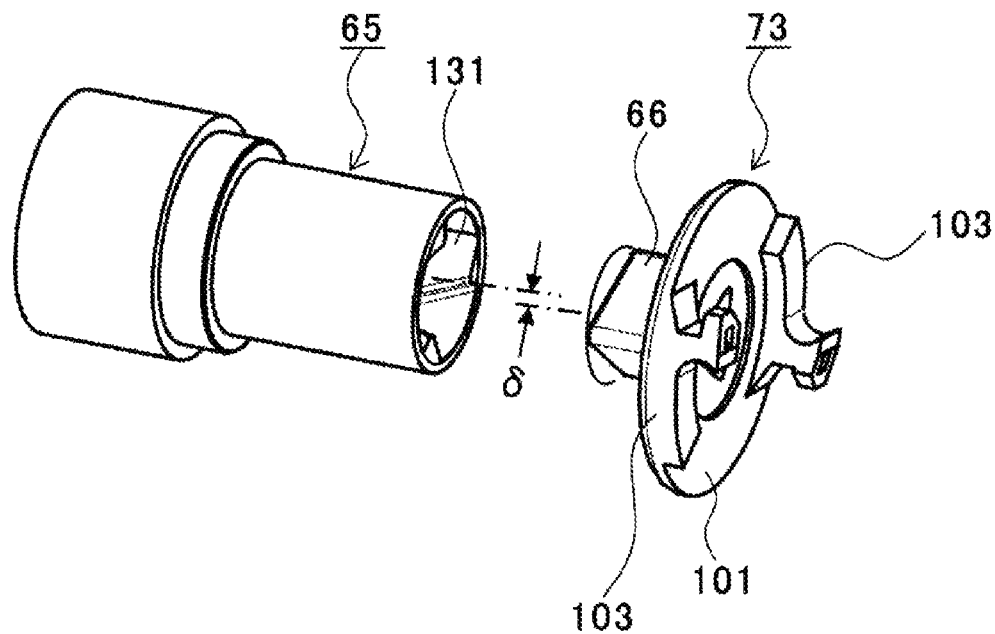
FIG. 17 is a diagram illustrating a view for explaining the relationship between a fitting projection and a fitting recess according to one or more embodiments.
Figure 18:
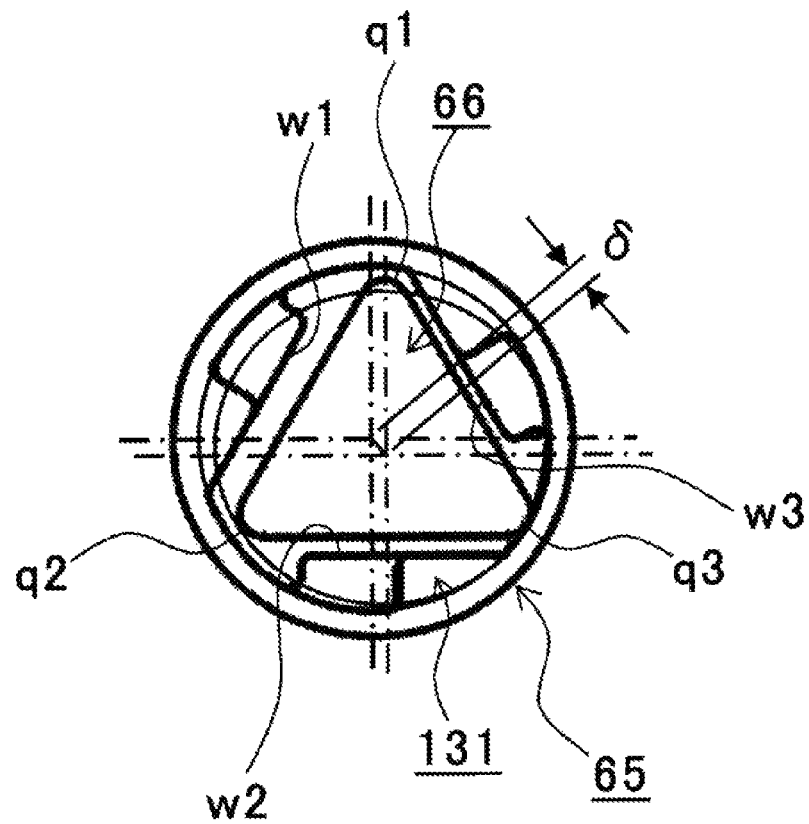
FIG. 18 is a diagram illustrating a view for explaining a relationship between the fitting projection and the fitting recess according to one or more embodiments.

FIG. 15 is a diagram illustrating a view of a state where the driving side coupling and the driven side coupling are not coupled with each other. FIG. 16 is a diagram illustrating a view of a state where the driving side coupling and the driven side coupling are coupled with each other. FIG. 17 is a diagram illustrating a view (1) for explaining a relationship between the fitting projection and the fitting recess. FIG. 18 is a diagram illustrating a view (2) for explaining a relationship between the fitting projection and the fitting recess.

In the figures, 64 designates the driving side coupling, 65 designates the driven side coupling, 66 designates the fitting projection, 131 designates the fitting recess, sh3 designates the driving shaft, 71 designates the coupling base, 72 designates the coupling middle, 73 designates the coupling tip, 75 designates the pin, and 77 designates the balls.

In the state the coupling control mechanism is activated and thereby the driving side coupling 64 and the driven side coupling 65 are decoupled from each other, the actuator of the coupling control mechanism pushes the coupling tip 73 in the direction of the arrow K, against the bias force of the spring 68 which biases the coupling tip 73 in the direction of the arrow J, as illustrated in FIG. 15.

Therefore, the spring 68 is compressed and the pin 75 is positioned in the pin idling space 110.

As described above, the coupling tip 73 is movable on the X-Y plane with respect to the driving shaft sh3. Thus, in the state where the driving side coupling 64 and the driven side coupling 65 are not coupled with each other and in the state where the driving side coupling 64 and the driven side coupling 65 are coupled with each other, a predetermined position of the coupling tip 73, for example, the fitting projection 66 of the coupling tip 73, may receive a force in the direction of the arrow L from the outside. However, the restoring force of the spring 68 provided inside of in the driving side coupling 64 pushes back the fitting projection 66 in the direction of the arrow M, and thus the coupling tip 73 will not be largely deviated or displaced from the axis of the driving shaft sh3.

On the other hand, when the coupling control mechanism is deactivated, the spring 68 extends to push the coupling tip 73 toward the driven side coupling 65 in the direction of the arrow N by the predetermined bias force thereof. With this, the coupling tip 73 is moved toward the driven side coupling 65 with respect to the driving shaft sh3, such that the fitting projection 66 of the coupling tip 73 is entered into and fit in the fitting recess 131 of the driven side coupling 65. Accordingly, the driving side coupling 64 and the driven side coupling 65 are coupled with each other to be rotatable together.

In the meantime, by means of the extension of the spring 68, the pin 75 is moved from the pin idling space 110 into the pin accommodation part 85, and further moved along the taper portions tp1 and tp2 (see FIG. 10) in the pin accommodation part 85, and then entered into and engaged with the grooves m1 and m2 (see FIG. 9).

When the pin 75 fixed to the drive shaft sh3 is engaged with the grooves m1 and m2 of the coupling base 71, the driving shaft sh3 and the coupling base 71 are connected with each other to be rotatable together. In this state, when the drive motor M (FIG. 5) is activated to rotate the driving shaft sh3, the rotation of the driving shaft sh3 is transmitted through the driving side coupling 64 to the driven side coupling 65.

Note that as illustrated in FIGS. 17 and 18, the fitting recess 131 has a triangle pole shape corresponding to the shape of the fitting projection 66. If a clearance between an outer circumference of the fitting projection 66 and an inner circumference of the fitting recess 131 is too small, the fitting projection 66 and the fitting recess 131 may not be smoothly fit to each other.

In view of this, in an embodiment as illustrated in FIG. 18, there is a predetermined clearance between the outer circumference of the fitting projection 66 and the inner circumference of the fitting recess 131, and, upon rotation of the fitting projection 66, corners q1, q2, and q3 of the triangle pole of the fitting projection 66 push walls w1, w2, and w3 at the inner circumference of the fitting recess 131, to rotate the driven side coupling 65.

In this structure, the following formula is satisfied, where δ represents an eccentricity amount between the driving shaft sh3 and the driven shaft sh4, φD represents an inner diameter of the driven side coupling 65, and φd represents an outer diameter of the fitting projection 66:

$$\varphi D \geq \varphi d + 2\delta$$

Note that in FIG. 17, 101 designates a flange of the coupling tip 73 and 103 designates the ball retainer.

Next, an operation of the second drive transmission device 51 when the drive motor M is activated in the state where the driving side coupling 64 and the driven side coupling 65 are coupled with each other is described.

FIG. 1 is a diagram illustrating a view for explaining the operation of the second drive transmission device when driving the drive motor in the state where the driving side coupling and the driven side coupling are coupled with each other.

In the state where the driving side coupling and the driven side coupling are coupled with each other in the second drive transmission device 51, the spring 68 biases the coupling tip 73 in the direction of the arrow N by the predetermined bias force thereof, to make the pin 75 and the grooves m1 and m2 (FIG. 9) engaged with each other. When the drive motor M (FIG. 5) is activated in this state, the rotation of the drive motor M is transmitted to the driving gear gr2 to rotate the driving shaft sh3 in the direction of the arrow P, and the rotation of the driving shaft sh3 is transmitted via the pin 75 to the driving side coupling 64, to rotate the driving side coupling 64 in the direction of the arrow Q.

In the meantime, the fitting projection 66 and the fitting recess 131 are fit to each other. Thus, the fitting projection 66 is rotated in the direction of the arrow R to rotate the driven side coupling 65 in the direction of the arrow S.

Accordingly, even if there is an eccentricity between the driving shaft sh3 and the driven shaft sh4, the driving side coupling 64 absorbs the eccentricity, and thus the rotation of the drive motor M is smoothly transmitted to the development roller 33. Therefore, this can prevent or suppress vibration in the image formation unit 16Bk (FIG. 3) and deterioration of the image quality.

Further, while the rotation of the drive motor M is being transmitted to the development roller 33, the fitting projection 66 is pushed against the driven side coupling 65 by the bias force of the spring 68. Thus, the driving side coupling 64 will not be decoupled from the driven side coupling 65.

While the driving shaft sh3 and the coupling tip 73 are driven to rotate, the spring 68 is rotated together with the driving shaft sh3 and the coupling tip 73. Thus, a friction between the spring 68 and the driving shaft sh3 or the coupling tip 73 would not occur.

In the above described one or more embodiments, the printer 10 (see FIG. 2) includes the image formation units 16Bk, 16Y, 16M, and 16C of black, yellow, magenta, and cyan and thus can form a multi-color image and also can form a single color image, by using only one of the image formation units, for example, by using only the black image formation unit 16Bk without using image formation units 16Y, 16M, and 16C.

In the case where only the black image formation unit 16Bk is used to form an image, the rotation of the drive motor M, upon activating the drive motor M, is transmitted only to the image formation unit 16Bk and is not transmitted to the image formation units 16Y, 16M, and 16C, by decoupling the driving side coupling 64 and the driven side coupling 65 of each of the image formation units 16Y, 16M, and 16C.

Next, an operation of the second drive transmission device 51 upon activating the drive motor M in the state where the driving side coupling 64 and the driven side coupling 65 are not coupled with each other is described.

Figure 19:
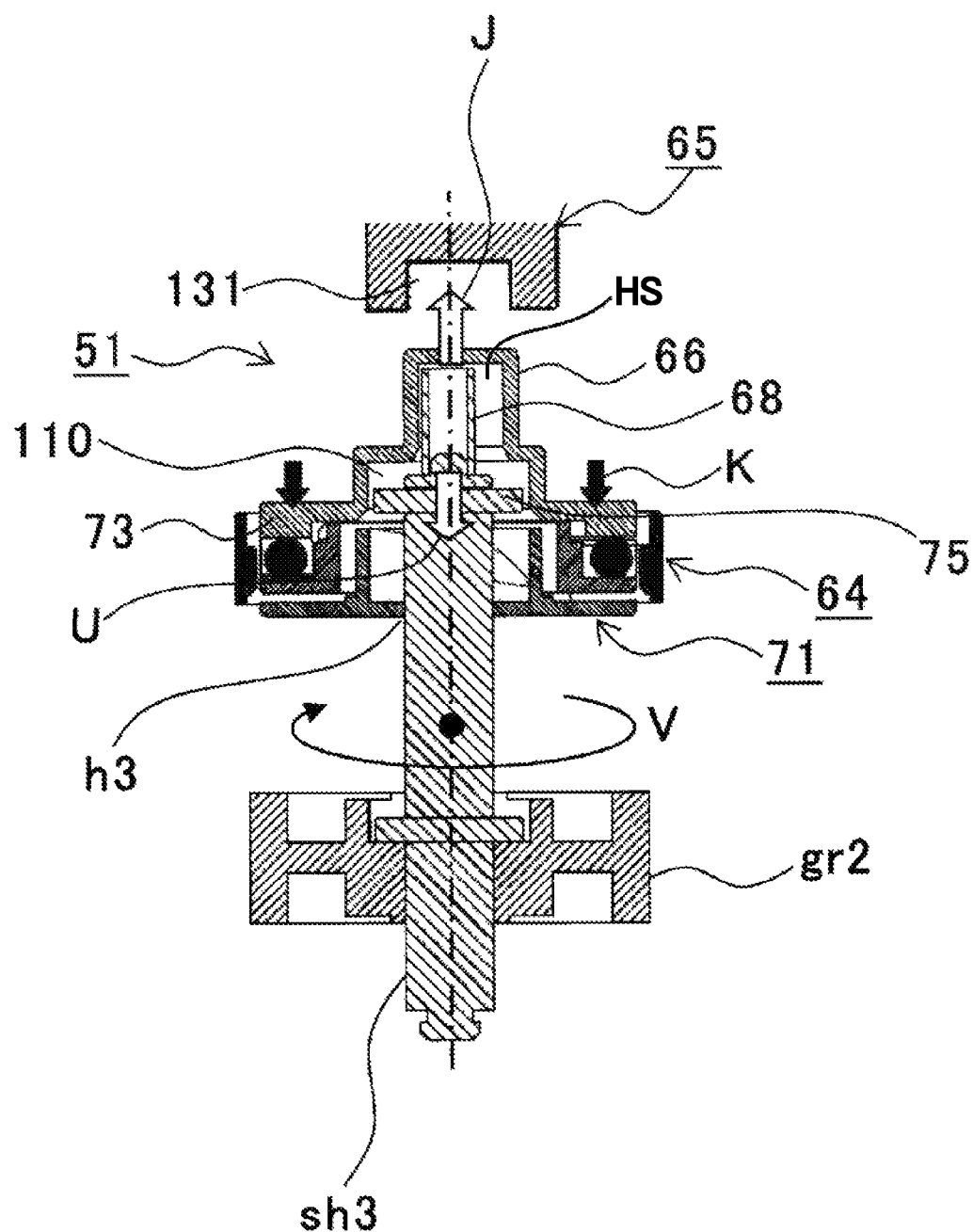
FIG. 19 is a diagram illustrating a view of an operation of the second drive transmission device when activating the drive motor in the state where the driving side coupling and the driven side coupling are not coupled with each other according to one or more embodiments.

FIG. 19 is a diagram illustrating a view of the operation of the second drive transmission device when activating the drive motor in the state where the driving side coupling and the driven side coupling are not coupled with each other.

In the state where the driving side coupling 64 and the driven side coupling 65 are not coupled with each other in the second drive transmission device 51, the spring 68 biases the coupling tip 73 in the direction of the arrow J by means of the predetermined bias force thereof and the actuator of the coupling control mechanism pushes the coupling tip 73 in the direction of the arrow K against the bias force of the spring 68. With this, the coupling tip 73 is pushed in the direction of the arrow U, and thus the spring 68 is compressed and the pin 75 is positioned in the pin idling space 110.

When activating the drive motor M (FIG. 5) in this state, the rotation of the drive motor M is transmitted to the driving gear gr2 to rotate the driving shaft sh3 in the direction of the arrow V. However, because the pin 75 of the driving shaft sh3 and the grooves m1 and m2 (FIG. 9) of the coupling base 71 of the driving side coupling 64 are not engaged with each other, the rotation of the driving shaft sh3 is not transmitted to the driving side coupling 64 to cause the driving shaft sh3 to idle away (rotate) in the driving side coupling 64.

At this moment, a friction occurs between the hole h3 of the coupling base 71 and the driving shaft sh3 is extremely small, and thus the driving side coupling 64 is not rotated.

Note that, because the driving shaft sh3 rotates and the coupling tip 73 does not rotate, the spring 68 may be rotated with the driving shaft sh3 because of a friction between the spring 68 and the seat 123 of the driving shaft sh3 or may not be rotated because of a friction between the spring 68 and the fitting projection 66 of the coupling tip 73. In an embodiment, the antifriction agent or the like is applied to both the contact surface of the seat 123 (FIG. 7) of the driving shaft sh3 in contact with the spring 68 and the contact surface of the end 121 of the fitting projection 66 in contact with the spring 68. This prevents the spring 68, the seat 123 of the driving shaft sh3, the end 121 of the fitting projection 66, and the like from being worn out.

According to one or more embodiments described above, the driving side coupling 64 includes the Oldham's coupling which absorbs the eccentricity between the driving shaft sh3 and the driven shaft sh4 and which includes the coupling base 71, the coupling middle 72, and the coupling tip 73, wherein the coupling tip 73 includes therein the spring 68 that biases the coupling tip 73 toward the driven side coupling 65 so as to couple the driving side coupling 64 and the driven side coupling 65 with each other by the bias force of the spring 68.

In this structure, the spring 68 does not need to be provided outside of the driving side coupling 64, and thus the second drive transmission device 51 can be downsized.

Further, because the driving side coupling 64 absorbs the eccentricity between the driving shaft sh3 and the driven shaft sh4, vibrations in the image formation units 16Bk, 16Y, 16M, and 16C can be prevented or suppressed and thus deterioration of the image quality can be prevented or suppressed.

Furthermore, in the state where the driving side coupling 64 and the driven side coupling 65 are not coupled with each other, displacements of the coupling tip 73 in the plane orthogonal to the driving shaft sh3 can be prevented by the restorative force of the spring 68. This facilitates the fitting operation between the fitting projection 66 and the fitting recess 131, and thus facilitates the coupling operation between the driving side coupling 64 and the driven side coupling 65. Accordingly, the fitting recess 131 can be downsized, which prevents an enlargement of the driven side coupling 65. Therefore, the second drive transmission device 51 can be further downsized.

Consequently, the printer 10 can be downsized.

Even if the driving shaft sh3 is driven to rotate in the state where the driving side coupling 64 and the driven side coupling 65 are not coupled with each other, the pin 75 of the driving shaft sh3 is disengaged from the grooves m1 and m2 of the coupling base 71 of the driving side coupling 64. Accordingly, the rotation of the driving shaft sh3 is not transmitted to the driving side coupling 64, and thus a friction between the actuator of the coupling control mechanism and the driving side coupling 64 can be prevent. This can further extend the life-span of the second drive transmission device 51.

In the above described one or more embodiments, the first and second drive transmission devices 50 and 51 that transmits the rotation to the photosensitive drum 31, the development roller 33, and the like for the image formation units 16Bk, 16Y, 16M, and 16C are described. However, an embodiment or a modification is not limited to this and may be applied to a drive transmission device that transmits a rotation to a roller or rotator other than the photosensitive drum 31, the development roller 33, and the like.

The above described one or more embodiments are applied to the printer 10. However, an embodiment or a modification is not limited to this and may be applied to an image formation apparatus, such as copy machines, facsimile machines, multifunction peripherals, and the like.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing descriptions. Hence, all configurations including the meaning and range within equivalent arrangements of the claims are intended to be embraced in the invention.

The invention claimed is:

1. A drive transmission device, comprising:
   a driving shaft configured to be rotated by a driving source;
   a driven shaft; and
   a coupling device including a driving side coupling connected to the driving shaft and a driven side coupling connected to the driven shaft, and configured to selectively couple the driving shaft and the driven shaft with each other to transmit a rotation of the driving shaft to the driven shaft, wherein
   the driving side coupling comprises an Oldham's coupling comprising a driving side rotor, an intermediate rotor, and a driven side rotor and configured to absorb an eccentricity between the driving shaft and the driven shaft, wherein
   the driven side rotor of the driving side coupling includes a fitting projection projected from a part of the driven side rotor of the driving side coupling toward the driven side coupling,
   the driven side coupling includes a fitting recess, wherein the fitting projection is fittable in the fitting recess,
   the driving side coupling and the driven side coupling are coupled with each other with the fitting projection of the driving side coupling and the fitting recess of the driven side coupling being fit to each other, whereas the driving side coupling and the driven side coupling are not coupled with each other with the fitting of the fitting projection and the fitting recess being released, and
   the driving side coupling further comprises a hollow space formed in the fitting projection of the driven side rotor and a bias member comprising a spring provided in the hollow space formed in the fitting projection of the driven side rotor, the bias member biasing the driven side rotor toward the driven side coupling.

2. The drive transmission device according to claim 1, wherein
   the bias member is provided in the hollow space and between an end of the driving shaft and an end of the fitting projection in an axial direction of the driving shaft.

3. The drive transmission device according to claim 1, wherein
   the bias member is configured, when the driven side rotor is displaced from an axis of the driving shaft, to move the driving side rotor back toward the axis of the driving shaft by a restoring force of the bias member.

4. The drive transmission device according to claim 3, wherein
the bias member is provided on the axis of the driving shaft.

5. The drive transmission device according to claim 3, wherein
the bias member comprises a coil spring, an axis of which is aligned with the axis of the driving shaft.

6. The drive transmission device according to claim 1, further comprising
a transmission member comprising one of a projection and a recess formed at the driving shaft and engageable with the driving side rotor to transmit the rotation of the driving shaft to the driving side coupling.

7. The drive transmission device according to claim 6, wherein
the driving side rotor includes an engagement part which comprises the other of the projection and the recess and which the transmission member is engageable with and disengageable from, and
by means of a bias force of the bias member, the transmission member is engaged with the engagement part.

8. The drive transmission device according to claim 1, wherein
the driven shaft transmits the rotation to at least one of a drum and a roller rotatable in an image formation unit connected to the drive transmission device, wherein the image formation unit includes the at least one of the drum and the roller rotatable to form an image.

9. The drive transmission device according to claim 8, wherein
the at least one of the drum and the roller comprises a developer carrier configured to develop a latent image formed on an image carrier with a developer.

10. An image formation apparatus, comprising:
the drive transmission device according to claim 1; and
an image formation unit including at least one of a drum and a roller rotatable to form an image in the image formation unit, wherein the at least one of the drum and the roller in the image formation unit is connected to the driven shaft of the drive transmission device.

11. An image formation apparatus, comprising:
the drive transmission device according to claim 1;
an image carrier on which a latent image can be formed; and
a developer carrier configured to develop the latent image formed on the image carrier with a developer to thereby form a developer image, one of the image carrier and the developer carrier is connected to the driven shaft of the drive transmission device.

* * * * *